US008513322B2

(12) United States Patent
Wright et al.

(10) Patent No.: US 8,513,322 B2
(45) Date of Patent: Aug. 20, 2013

(54) POLYMERIC BEADS AND METHODS OF MAKING POLYMERIC BEADS

(75) Inventors: Robin E. Wright, Inver Grove Heights, MN (US); Mahfuza B. Ali, Mendota Heights, MN (US); Jessica M. Buchholz, Saint Paul, MN (US); Louis C. Haddad, Mendota Heights, MN (US); Linda K. M. Olson, Saint Paul, MN (US); Matthew T. Scholz, Woodbury, MN (US); Narina Y. Stepanova, Inver Grove Heights, MN (US); Michael J. Svarovsky, Eagan, MN (US); Richard L. Walter, Saint Paul, MN (US); Caroline M. Ylitalo, Stillwater, MN (US); Diane R. Wolk, Woodbury, MN (US); Yifan Zhang, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/759,283

(22) Filed: Jun. 7, 2007

(65) Prior Publication Data
US 2008/0300339 A1 Dec. 4, 2008

Related U.S. Application Data

(60) Provisional application No. 60/941,148, filed on May 31, 2007.

(51) Int. Cl.
*C08J 3/28* (2006.01)
*C08F 2/46* (2006.01)
*C08F 22/20* (2006.01)
*C08F 20/26* (2006.01)
*C08F 20/28* (2006.01)

(52) U.S. Cl.
USPC ............. 522/153; 522/154; 526/89; 526/321; 526/323.1; 526/323.2; 526/333; 525/304; 525/308

(58) Field of Classification Search
USPC ..................... 522/153, 154, 3; 424/484, 489, 424/497, 501; 526/89, 321, 323.1, 323.2, 526/333; 525/304, 308
See application file for complete search history.

(56) References Cited

U.S. PATENT DOCUMENTS

| 1,529,256 A | 3/1925 | Kelley |
| RE24,906 E | 12/1960 | Ulrich |

(Continued)

FOREIGN PATENT DOCUMENTS

| DE | 10114496 | 9/2002 |
| EP | 0 201 214 | 11/1986 |

(Continued)

OTHER PUBLICATIONS

Andreopoulos, F.M., et al., "Photoscissable hydrogel synthesis via rapid photopolymerization of novel PEG-based polymers in the absence of photoinitiators", *J. Am. Chem. Soc.*, vol. 118, No. 26, pp. 6235-6240 (Jul. 3, 1996).

(Continued)

*Primary Examiner* — Michael Pepitone
(74) *Attorney, Agent, or Firm* — Jean A. Lown

(57) ABSTRACT

Polymeric beads and methods of making the polymeric beads are described. The polymeric beads are crosslinked hydrogels or dried hydrogels. The polymeric beads are formed from droplets of a precursor composition that are exposed to radiation. The droplets are totally surrounded by a gas phase. The precursor composition contains a polar solvent and a polymerizable material miscible in the polar solvent. The polymerizable material has an average number of ethylenically unsaturated groups per monomer molecule equal to at least 1.2.

24 Claims, 4 Drawing Sheets

(56) References Cited

U.S. PATENT DOCUMENTS

| | | | |
|---|---|---|---|
| 3,121,021 A | 2/1964 | Copeland | |
| 3,389,827 A | 6/1968 | Abere | |
| 3,645,835 A | 2/1972 | Hodgson | |
| 3,975,350 A | 8/1976 | Hudgin et al. | |
| 4,112,213 A | 9/1978 | Waldman | |
| 4,157,418 A | 6/1979 | Heilmann | |
| 4,231,370 A | 11/1980 | Mroz et al. | |
| 4,351,922 A * | 9/1982 | Yoshida et al. | 525/116 |
| 4,444,961 A * | 4/1984 | Timm | 526/88 |
| 4,499,896 A | 2/1985 | Heinecke | |
| 4,542,176 A | 9/1985 | Graham | |
| 4,597,975 A | 7/1986 | Woodward et al. | |
| 4,598,004 A | 7/1986 | Heinecke | |
| 4,646,730 A | 3/1987 | Schonfeld et al. | |
| 4,693,776 A | 9/1987 | Krampe | |
| 4,726,989 A | 2/1988 | Mrozinski | |
| 4,814,131 A | 3/1989 | Atlas | |
| 4,867,881 A | 9/1989 | Kinzer | |
| 4,873,299 A | 10/1989 | Nowakowsky et al. | |
| 4,929,400 A | 5/1990 | Rembaum et al. | |
| 4,971,732 A | 11/1990 | Wichterle | |
| 4,988,568 A * | 1/1991 | Hasegawa et al. | 428/402 |
| 5,059,664 A * | 10/1991 | Yada et al. | 526/240 |
| 5,088,483 A | 2/1992 | Heinecke | |
| 5,120,594 A | 6/1992 | Mrozinski | |
| 5,126,381 A | 6/1992 | Liscomb | |
| 5,160,315 A | 11/1992 | Heinecke | |
| 5,260,360 A | 11/1993 | Mrozinski | |
| 5,435,816 A | 7/1995 | Spurgeon et al. | |
| 5,437,932 A | 8/1995 | Ali et al. | |
| 5,447,727 A * | 9/1995 | Graham | 424/487 |
| 5,506,279 A | 4/1996 | Babu et al. | |
| 5,506,324 A | 4/1996 | Gartner et al. | |
| 5,514,379 A | 5/1996 | Weissleder et al. | |
| 5,531,855 A | 7/1996 | Heinecke | |
| 5,667,541 A | 9/1997 | Klun et al. | |
| 5,670,557 A | 9/1997 | Dietz et al. | |
| 5,674,521 A | 10/1997 | Gehrke et al. | |
| 5,674,561 A | 10/1997 | Dietz et al. | |
| 5,690,705 A | 11/1997 | Holmes et al. | |
| 5,714,259 A | 2/1998 | Holmes et al. | |
| 5,733,570 A | 3/1998 | Chen | |
| 5,738,642 A | 4/1998 | Heinecke | |
| 5,779,632 A | 7/1998 | Dietz et al. | |
| 5,849,325 A | 12/1998 | Heinecke | |
| 5,954,869 A | 9/1999 | Elfersy et al. | |
| 5,962,544 A | 10/1999 | Waller, Jr. | |
| 6,066,325 A | 5/2000 | Wallace et al. | |
| 6,297,424 B1 | 10/2001 | Olson et al. | |
| 6,372,407 B1 | 4/2002 | Liu | |
| 6,376,590 B2 | 4/2002 | Kolb et al. | |
| 6,386,699 B1 | 5/2002 | Ylitalo | |
| 6,407,195 B2 | 6/2002 | Sherman | |
| 6,467,897 B1 | 10/2002 | Wu et al. | |
| 6,471,975 B1 | 10/2002 | Banovetz et al. | |
| 6,559,351 B1 | 5/2003 | Eakin | |
| 6,566,575 B1 | 5/2003 | Stickels | |
| 6,649,249 B1 | 11/2003 | Engle | |
| 6,669,981 B2 | 12/2003 | Parsons et al. | |
| 6,709,716 B2 | 3/2004 | Uy et al. | |
| 6,772,708 B2 | 8/2004 | Klofta et al. | |
| 6,800,278 B1 | 10/2004 | Perrault et al. | |
| 6,808,738 B2 | 10/2004 | DiTizio et al. | |
| 6,852,255 B2 | 2/2005 | Yang et al. | |
| 6,905,698 B1 | 6/2005 | Aldcroft et al. | |
| 6,960,275 B2 | 11/2005 | Vesley | |
| 6,967,261 B1 | 11/2005 | Soerens et al. | |
| 7,005,143 B2 | 2/2006 | Abuelyaman et al. | |
| 7,074,063 B1 | 7/2006 | Bailey et al. | |
| 7,105,809 B2 | 9/2006 | Wood | |
| 7,223,364 B1 | 5/2007 | Johnston | |
| 2003/0021961 A1 | 1/2003 | Ylitalo | |
| 2003/0054025 A1 | 3/2003 | Cantor | |
| 2004/0086479 A1 | 5/2004 | Grinstaff et al. | |
| 2004/0157971 A1 | 8/2004 | Kim | |
| 2005/0058821 A1 | 3/2005 | Smith | |
| 2005/0124724 A1 * | 6/2005 | Burton et al. | 523/122 |
| 2005/0215752 A1 * | 9/2005 | Popp et al. | 528/272 |
| 2005/0287191 A1 | 12/2005 | Munro et al. | |
| 2006/0034899 A1 | 2/2006 | Ylitalo | |
| 2006/0035039 A1 | 2/2006 | Ylitalo | |
| 2006/0051384 A1 | 3/2006 | Scholz et al. | |
| 2006/0051385 A1 | 3/2006 | Scholz | |
| 2006/0052452 A1 | 3/2006 | Scholz | |
| 2006/0062854 A1 | 3/2006 | Chandra et al. | |
| 2006/0127435 A1 | 6/2006 | Van Voris et al. | |
| 2006/0148950 A1 | 7/2006 | Davidson et al. | |
| 2006/0155057 A1 | 7/2006 | Hermeling et al. | |
| 2006/0212011 A1 | 9/2006 | Popp et al. | |
| 2006/0235141 A1 | 10/2006 | Riegel et al. | |
| 2007/0031505 A1 | 2/2007 | Roy | |
| 2007/0048505 A1 | 3/2007 | Shimada | |
| 2008/0207794 A1 | 8/2008 | Wright | |
| 2010/0266794 A1 | 10/2010 | Wright | |
| 2010/0295219 A1 | 11/2010 | Ylitalo | |

FOREIGN PATENT DOCUMENTS

| | | |
|---|---|---|
| EP | 0 233 667 | 8/1987 |
| EP | 0317858 | 5/1989 |
| EP | 0 374 807 | 6/1990 |
| EP | 0 679 333 | 11/1995 |
| EP | 1 371 668 | 12/2003 |
| JP | 54074886 | 6/1979 |
| JP | 58-182552 | 10/1983 |
| JP | 6248107 | 9/1994 |
| JP | 07068705 | 3/1995 |
| JP | 7133355 | 5/1995 |
| JP | 10018125 | 1/1998 |
| JP | 2002180361 | 6/2002 |
| JP | 2002322203 | 8/2002 |
| JP | 2003034703 | 2/2003 |
| JP | 2007015232 | 1/2007 |
| KR | 2001016592 | 3/2001 |
| KR | 2003-45730 | 6/2003 |
| WO | WO 93/21237 | 10/1993 |
| WO | WO 99/56542 | 11/1999 |
| WO | WO 00/73082 | 12/2000 |
| WO | WO 00/73083 | 12/2000 |
| WO | WO 01/02093 | 1/2001 |
| WO | WO 01/41818 | 6/2001 |
| WO | WO 01/56625 | 8/2001 |
| WO | WO 03/061538 | 7/2003 |
| WO | WO 2004/028255 | 4/2004 |
| WO | WO 2004/105687 | 12/2004 |
| WO | WO 2005/062018 | 7/2005 |
| WO | WO 2006/002641 | 1/2006 |
| WO | WO 2006/011062 | 2/2006 |
| WO | WO 2006/027702 | 3/2006 |
| WO | WO 2006/027703 | 3/2006 |
| WO | WO 2006/079631 | 8/2006 |
| WO | WO 2007/018422 | 2/2007 |
| WO | WO 2007/070310 | 6/2007 |

OTHER PUBLICATIONS

Andreopoulos, F.M. et al., "Light-indusing tailoring of PEG-hydrogel properties", *Biomaterials*, vol. 19, No. 15, pp. 1343-1352, (Aug. 31, 1998).

Lin-Gibson, S., et al., "Synthesis and characterization of poly(ethylene glycol) dimethacrylate hydrogels", *Macromolecular Symposia*, vol. 227, pp. 243-254, (Dec. 31, 2005).

Mellott, M.B., et al., "Release of protein from highly cross-linked hydrogels of poly(ethylene glycol) diacrylate fabricated by UV polymerization", *Biomaterials*, vol. 22, pp. 929-941 (2001).

Russell, R.J., et al., "Poly(ethylene glycol) hydrogel-encapsulated fluorophore-enzyme conjugates for direct detection of organophosphorus neurotoxins", *Analytical Chemistry*, vol. 71, No. 21, pp. 4909-4912 (Nov. 1, 1999).

Sugimoto, M., et al., "Applicability of UV Curable Urethane Acrylate Coating at High Drawing Speed", *International Wire & Cable Symposium Proceedings*, pp. 418-425 (1997).

U.S. Appl. No. 11/847,397, filed Aug. 30, 2007, entitled "Polymeric Fibers and Methods of Making".

Barrett, "Microcontact Printing of Poly(organophosphazenes): Potential Applications for Selective Cell Adhesion", Polymeric Materials: Science & Engineering, 2004, vol. 91. pp. 633-634.

Calvert, 224th ACS National Meeting. Abstract MTLS-008, 2002.

Diramio, "Poly(ethylene glycol) Methacrylate/Dimethacrylate Hydrogels for Controlled Release of Hydrophobic Drugs", Biotechnol. Prog., Jul.-Aug. 2005, vol. 21, No. 4, pp. 1281-1288.

Drtina, "Highly Cross-Linked Azlactone Functional Supports of Tailorable Polarity", Macromolecules, 1996, vol. 29, No. 13, pp. 4486-4489.

Hahn, "Photolithographic Patterning of Polyethylene Glycol Hydrogels", Biomaterials, 2006, vol. 27, No. 12, pp. 2519-2524.

Karp, "A Photolithographic Method to Create Cellular Micropatterns", Biomaterials, Feb. 15, 2006, vol. 27, pp. 4755-4764.

Kizilel, "Photopolymerization of Poly(Ethylene Glycol) Diacrylate on Eosin-Functionalized Surfaces", Langmuir, Sep. 28, 2004, vol. 20, No. 20, pp. 8652-8658.

Lee, "Multilayer Transfer Printing on Microreservoir-Patterned Substrate Employing Hydrophilic Composite Mold for Selective Immobilization of Biomolecules", Langmuir, Aug. 29, 2006, vol. 22, No. 18, pp. 7689-7694.

Lensen, "Micro- and Nanopatterned Star Poly(ethylene glycol) (PEG) Materials Prepared by UV-based Imprint Lithography", Langmuir, Jul. 3, 2007, vol. 23, No. 14, pp. 7841-7846.

Wente, "Manufacture of Superfine Organic Fibers", Naval Research Laboratory, Report No. 4364, May 25, 1954 (21 pages).

Wente, "Superfine Thermoplastic Fibers", Industrial and Engineering Chemistry, Aug. 1956, vol. 48, No. 8, 1342-1346.

Zhou, 229th ACS National Meeting, Abstract BIOT-078, Mar. 13-17, 2005.

U.S. Appl. No. 61/013,617, filed Dec. 13, 2007.

Form 1507 EP Search Report 61756EP004, Mar. 29, 2010.

Material Safety Data Sheet for ethylene dimethacrylate (3 pages), Oct. 1995.

Material Safety Data Sheet for diethylene glycol dimethacrylate (1 page).

Material Safety Data Sheet for triethylene glycol dimethacrylate (1 page).

Material Safety Data Sheet for trimethylol propane trimethacrylate (7 pages), Jan. 8, 2009.

Material Safety Data Sheet for trimethylol propane triacrylate (7 pages), Jan. 8, 2009.

Material Safety Data Sheet for triethylene glycol dimethacrylate (7 pages), Jan. 8, 2009.

Sartomer Application Bulletin, "Water Reducible Acrylate Monomers" (2 pages).

Tuncel, A., Applied et al., *Nonswellable and Swellable Poly(EGDMA) Microspheres*; Journal of Applied Polymer Science, vol. 62, pp. 789-798, (1996).

* cited by examiner

POLYMERIC BEADS AND METHODS OF MAKING POLYMERIC BEADS

PRIORITY CLAIM

This application claims priority to U.S. patent application Ser. No. 11/423,048 filed on Jun. 8, 2006 and to U.S. Provisional Patent Application No. 60/941,148 filed on May 31, 2007.

TECHNICAL FIELD

The present disclosure is directed to polymeric beads and methods of making the polymeric beads.

BACKGROUND

There are numerous commercial applications for polymeric beads such as, for example, biological uses, medical uses, and industrial uses. Applications for polymeric beads continue to increase and expand in scope. There is a continuing need for polymeric beads with unique physical properties, chemical properties, and added versatility. Various methods are known for making polymeric beads. In most of the methods, droplets of polymerizable materials are reacted to form polymeric beads that are essentially spherical.

For example, emulsion polymerization methods are well known for making polymeric beads. Droplets of polymerizable materials in an oil or water emulsion are reacted to form polymeric beads. Although these methods work well, the resulting polymeric beads are often porous. Additionally, a thorough cleaning of the resulting polymeric beads is often needed to remove residual non-polymerizable materials such as oils and emulsifiers. In many cases, this cleaning often removes only the surface contamination but does not remove oils or other compounds that may be entrained within the polymeric beads. Although the polymerizable materials are often heated to initiate the polymerization reactions, radiation can also be used.

In another example, droplets of a polymerizable material can be formed that are allowed to fall under the force of gravity. The falling droplets can be subjected to radiation to initiate polymerization. Polymerization occurs as the droplets fall resulting in the formation of polymeric beads. Alternatively, the polymerizable materials can be subjected to radiation prior to the formation of the droplets but polymerization continues as the droplets fall resulting in the formation of polymeric beads.

SUMMARY OF THE INVENTION

Polymeric beads and methods of making the polymeric beads are described. The polymeric beads contain a crosslinked hydrogel that optionally can be dried. The polymeric beads, in some embodiments, can contain an active agent. That is, the polymeric beads can function as a carrier for various active agents.

In a first aspect, a method of making a polymeric bead is provided. The method includes forming a precursor composition containing (a) greater than 10 weight percent polar solvent based on a total weight of the precursor composition and (b) polymerizable material that is miscible with the polar solvent. The polymerizable material has an average number of ethylenically unsaturated groups per monomer molecule equal to at least 1.2. The method further includes forming a droplet of the precursor composition, wherein the droplet is totally surrounded by a gas phase. The droplet is exposed to radiation for a time sufficient to at least partially polymerize the polymerizable material and to form a first swollen polymeric bead.

In a second aspect, another method of making a polymeric bead is provided. The method includes forming a precursor composition containing (a) greater than 10 weight percent to 85 weight percent polar solvent based on a total weight of the precursor composition and (b) 15 weight percent to less than 90 weight percent polymerizable material based on the total weight of the precursor composition. The polymerizable material is miscible with the polar solvent and has an average number of ethylenically unsaturated groups per monomer molecule equal to at least 1.2. The polymerizable material includes a poly(alkylene oxide (meth)acrylate) having at least 2 (meth)acryloyl groups and having at least 5 alkylene oxide units. The polymerizable material also can include 0 to less than 20 weight percent of an anionic monomer based on the total weight of the polymerizable material. The anionic monomer contains an ethylenically unsaturated group in addition to an acidic group, a salt of an acidic group, or a mixture thereof. The method further includes forming a droplet of the precursor composition, wherein the droplet is totally surrounded by a gas phase. The droplet is exposed to radiation for a time sufficient to at least partially polymerize the polymerizable material and to form a first swollen polymeric bead.

In a third aspect, an article is provided that includes a polymeric bead. The polymeric bead has an aspect ratio no greater than 3:1 and is a free-radical polymerization reaction product of a precursor composition that contains (a) greater than 10 weight percent to 85 weight percent polar solvent based on a total weight of the precursor composition and (b) 15 weight percent to less than 90 weight percent polymerizable material based on the total weight of the precursor composition. The polymerizable material is miscible with the polar solvent and has an average number of ethylenically unsaturated groups per monomer molecule equal to at least 1.2. The polymerizable material includes a poly(alkylene oxide (meth)acrylate) having at least 2 (meth)acryloyl groups and having at least 5 alkylene oxide units. The polymerizable material also can include 0 to less than 20 weight percent of an anionic monomer based on the total weight of the polymerizable material. The anionic monomer contains an ethylenically unsaturated group in addition to an acidic group, a salt of an acidic group, or a mixture thereof.

In a fourth aspect, an article is provided that includes a polymeric bead that contains an active agent. The polymeric bead has an aspect ratio no greater than 3:1 and includes (a) a reaction product of a precursor composition that contains polymerizable material that has an average number of ethylenically unsaturated groups per monomer molecule equal to at least 1.2 and (b) an active agent. The polymerizable material includes a poly(alkylene oxide (meth)acrylate) having at least 2 (meth)acryloyl groups and having at least 5 alkylene oxide units. The polymerizable material also can include 0 to less than 20 weight percent of an anionic monomer based on a total weight of the polymerizable material. The anionic monomer contains an ethylenically unsaturated group in addition to an acidic group, a salt of an acidic group, or a mixture thereof.

The above summary of the present invention is not intended to describe each disclosed embodiment or every implementation of the present invention. The Detailed Description and Examples that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF THE INVENTION

Polymeric beads and methods of making the polymeric beads are described. The polymeric beads are crosslinked hydrogels or dried hydrogels. As used herein, the term "hydrogel" refers to a polymeric material that is hydrophilic and that is either swollen or capable of being swollen with a polar solvent. The polymeric material typically swells but does not dissolve when contacted with the polar solvent. That is, the hydrogel is insoluble in the polar solvent. The swollen polymeric beads can be dried to remove at least some of the polar solvent. In some embodiments, the polymeric beads also contain an active agent.

The polymeric beads are formed from droplets of a precursor composition. As used herein, the term "precursor composition" refers to the reactant mixture that is subjected to radiation to form the polymeric beads. That is, the precursor composition describes the reaction mixture prior to polymerization. The precursor composition contains a polar solvent and polymerizable material that is miscible with the polar solvent. The precursor composition can also include other optional additives such as processing agents, active agents, or mixtures thereof. The droplets of the precursor composition are typically totally surrounded by a gaseous phase. Upon exposure to radiation, the polymerizable material within the precursor composition undergoes a free-radical polymerization reaction and polymeric beads are formed. The reaction product is a hydrogel that contains polymerized material, the polar solvent, and any optional additives.

As used herein, the terms "bead" and "polymeric bead" are used interchangeably and refer to a particle that contains polymeric material, that has a smooth surface, and that has an aspect ratio no greater than 3:1, no greater than 2.5:1, no greater than 2:1, no greater than 1.5:1, or 1:1. That is, the aspect ratio is in the range of 3:1 to 1:1. The aspect ratio refers to the ratio of the longest dimension of the polymeric bead to the dimension orthogonal to the longest dimension. The shape of the polymeric bead is often spherical or elliptical; however, the spherical or elliptical shape can be collapsed when the polymeric bead is dried. As used herein, the term "smooth" refers to a surface that is free of discontinuities and sharp edges. The shape of polymeric beads prepared from droplets is not the same as the shape of particles prepared by processes such as milling or grinding where irregular surfaces result.

Figure 1:
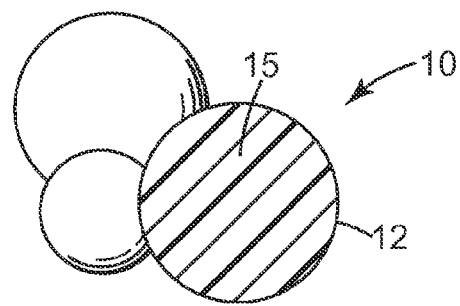
FIG. 1 is a schematic rendition of a plurality of polymeric beads according to the invention, with one of the polymeric beads illustrated in cross-section.

FIG. 1 is a schematic representation of a polymeric bead 10 having an outer surface 12 and an inner composition 15. Polymeric bead 10 is often homogeneous, without any discernible interface between the outer surface 12 and the inner composition 15, even when viewed under a microscope such as a scanning electron microscope or optical microscope. The dried polymeric bead often remains homogeneous and does not contain internal pores or channels such as macroscopic (i.e., greater than 100 nm) pores or channels. This homogeneity of the polymeric bead and the dried polymeric bead refers to the polymeric matrix containing the polymerized material and the polar solvent. If an active agent is present, the active agent may or may not be distributed homogeneously throughout the polymeric bead. Further, the active agent may be present in a separate phase from the polymeric matrix.

Generally, the polymeric beads (particularly those with an active agent) have no discernible porosity or voids when viewed under a microscope. For example, there are no discernible pores when the polymeric beads are viewed using environmental scanning electron microscopy with magnification up to 50 times (see FIG. 6A for an exemplary swollen polymeric bead). Often no discernible pores can be seen when the polymeric beads are viewed using field emission scanning electron microscopy with a magnification up to 50,000 times.

The polymeric beads are formed from a precursor composition that contains (i) a polar solvent and (ii) a polymerizable material that is miscible with the polar solvent. The polymerizable material contains at least one monomer that is capable of free-radical polymerization and has an average number of ethylenically unsaturated groups per monomer molecule equal to at least 1.2. In some embodiments, other optional additives such as processing agents, active agents, or mixtures thereof can be present in the precursor composition. If present, these optional additives can be either dissolved or dispersed in the precursor composition.

As used herein, the term "polar solvent" refers to water, a water-miscible organic solvent, or a mixture thereof. Although the polar solvent is not reactive in the precursor composition (i.e., the polar solvent is not a monomer), the polar solvent typically swells the resulting polymeric bead. That is, the polymerizable material is polymerized in the presence of the polar solvent so the resulting polymeric bead is swollen with the polar solvent. Swollen polymeric beads contain at least some of the polar solvent included in the precursor composition.

Any water used in the precursor composition can be tap water, well water, deionized water, spring water, distilled water, sterile water, or any other suitable type of water. A water-miscible organic solvent refers to an organic solvent that is typically capable of hydrogen bonding and that forms a single phase solution when mixed with water. For example, a single phase solution exists when the water-miscible organic solvent is mixed with water in an amount equal to at least 10 weight percent, at least 20 weight percent, at least 30 weight percent, at least 40 weight percent, or at least 50 weight percent based on a total weight of the solution. While ideally a liquid at room temperature, the water-miscible organic solvent may also be a solid having a melting temperature below about 50° C. Suitable water-miscible organic solvents, which often contain hydroxyl or oxy groups, include alcohols, polyols having a weight average molecular weight no greater than about 300 g/mole, ethers, and polyethers having a weight average molecular weight no greater than about 300 g/mole. Exemplary water-miscible organic solvents include, but are not limited to, methanol, ethanol, isopropanol, n-propanol, ethylene glycol, triethylene glycol, glycerol, polyethylene glycol, propylene glycol, dipropylene glycol, polypropylene glycol, random and block copolymers of ethylene oxide and propylene oxide, dimethoxytetraglycol, butoxytriglycol, trimethylene glycol trimethyl ether, ethylene glycol dimethyl ether, ethylene glycol monobutyl ether, ethylene glycol monoethyl ether, and mixtures thereof.

The polar solvent is often present in an amount greater than 10 weight percent based on a total weight of the precursor composition. In some exemplary precursor compositions, the polar solvent is present in an amount equal to at least 15 weight percent, at least 20 weight percent, at least 25 weight percent, at least 30 weight percent, at least 40 weight percent, or at least 50 weight percent based on the total weight of the precursor composition. The polar solvent in the precursor composition can be present in an amount up to 85 weight percent, up to 80 weight percent, up to 75 weight percent, up to 70 weight percent, or up to 60 weight percent based on the total weight of the precursor composition. In some precursor compositions, the polar solvent is present in an amount greater than 10 to 85 weight percent, greater than 10 to 80 weight percent, 20 to 80 weight percent, 30 to 80 weight percent, or 40 to 80 weight percent based on the total weight of the precursor composition.

The polymerizable material is miscible with the polar solvent and does not phase separate from the polar solvent. As used herein with reference to the polymerizable material, the term "miscible" means that the polymerizable material is predominately soluble in the polar solvent or compatible with the polar solvent. However, there can be a small amount of the polymerizable material that does not dissolve in the polar solvent. For example, the polymerizable material may have an impurity that does not dissolve in the polar solvent. Generally, at least 95 weight percent, at least 97 weight percent, at least 98 weight percent, at least 99 weight percent, at least 99.5 weight percent, at least 99.8 weight percent, or at least 99.9 weight percent of the polymerizable material is soluble in the polar solvent.

As used herein, the term "polymerizable material" can refer to a monomer or to a mixture of monomers. The terms "monomer" and "monomer molecule" are used interchangeably to refer to a compound that contains at least one polymerizable group capable of free-radical polymerization. The polymerizable group is usually an ethylenically unsaturated group.

In some embodiments, the polymerizable material includes a monomer of a single chemical structure. In other embodiments, the polymerizable material includes a plurality of different monomers (i.e., there is a mixture of monomers having different chemical structures). Whether the polymerizable material includes one monomer or a mixture of monomers, the polymerizable material has an average number of polymerizable groups (e.g., ethylenically unsaturated groups) per monomer molecule equal to at least 1.2. The polymerizable material can include, for example, a single type of monomer that has two or more polymerizable groups. Alternatively, the polymerizable material can include a plurality of different types of monomers such that the average number of polymerizable groups per monomer molecule is equal to at least 1.2. In some embodiments, the average number of polymerizable groups per monomer molecule is equal to at least 1.3, at least 1.4, at least 1.5, at least 1.6, at least 1.7, at least 1.8, at least 1.9, at least 2.0, at least 2.1, at least 2.2, at least 2.3, at least 2.4, at least 2.5, at least 2.6, at least 2.7, at least 2.8, at least 2.9, or at least 3.0.

The average number of polymerizable groups per molecule is determined by determining the relative molar concentration of each monomer molecule and its functionality (number of polymerizable groups) and determining the number average functionality. For example, a polymerizable material that contains X mole percent of a first monomer having n polymerizable groups and (100−X) mole percent of a second monomer having m polymerizable groups has an average number of polymerizable groups per monomer molecule equal to [n(X)+m(100−X)]/100. In another example, a polymerizable material that contains X mole percent of a first monomer having n polymerizable groups, Y mole percent of a second monomer having m polymerizable groups, and (100−X−Y) mole percent of a third monomer having q polymerizable groups has an average number of polymerizable groups per molecule equal to [n(X)+m(Y)+q(100−X−Y)]/100.

The polymerizable material includes at least one monomer having two or more polymerizable groups. Likewise, a first monomer having three or more polymerizable groups can be mixed with a second monomer having one polymerizable group, a second monomer having two polymerizable groups, or a mixture thereof provided that the mixture contains an average number of polymerizable groups per monomer molecule equal to at least 1.2. Often, a monomer having three or more polymerizable groups contains monomeric impurities having two polymerizable groups, one polymerizable group, or a mixture thereof.

The precursor composition generally contains 15 to 90 weight percent polymerizable material based on the total weight of the precursor composition. For example, the precursor composition contains at least 15 weight percent, at least 20 weight percent, at least 25 weight percent, at least 30 weight percent, at least 40 weight percent, or at least 50 weight percent polymerizable material. The precursor composition can include up to 90 weight percent, up to 80 weight percent, up to 75 weight percent, up to 70 weight percent, or up to 60 weight percent polymerizable material. In some precursor compositions, the amount of polymerizable material is in the range of 20 to 90 weight percent, 30 to 90 weight percent, 40 to 90 weight percent, or 40 to 80 weight percent based on the total weight of the precursor composition.

The polymerizable material often includes one or more (meth)acrylates. As used herein, the term "(meth)acrylate" refers to a methacrylate, acrylate, or mixture thereof. The (meth)acrylate contains a (meth)acryloyl group. The term "(meth)acryloyl" refers to a monovalent group of formula $H_2C=CR^b-(CO)-$ where $R^b$ is hydrogen or methyl and (CO) denotes that the carbon is attached to the oxygen with a double bond. The (meth)acryloyl group is the polymerizable group (i.e., the ethylenically unsaturated group) of the (meth)acrylate that is capable of free-radical polymerization. All the polymerizable materials can be (meth)acrylates or the polymerizable materials can include one or more (meth)acrylates in combination with other monomers that have ethylenically unsaturated groups.

In many embodiments, the polymerizable material includes a poly(alkylene oxide (meth)acrylate). The terms poly(alkylene oxide (meth)acrylate), poly(alkylene glycol (meth)acrylate), alkoxylated (meth)acrylate, and alkoxylated poly(meth)acrylate can be used interchangeably to refer to a (meth)acrylate having at least one group that contains two or more alkylene oxide residue units (also referred to as alkylene oxide units). There are often at least 5 alkylene oxide residue units. The alkylene oxide unit is a divalent group of formula —OR— where R is an alkylene having up to 10 carbon atoms, up to 8 carbon atoms, up to 6 carbon atoms, or up to 4 carbon atoms. The alkylene oxide units are often selected from ethylene oxide units, propylene oxide units, butylene oxide units, or mixtures thereof.

As long as the average number of ethylenically unsaturated groups (e.g., (meth)acryloyl groups) per monomer molecule is equal to at least 1.2, the polymerizable material can include a single (meth)acrylate or a mixture of (meth)acrylates. To provide an average number of (meth)acryloyl groups per monomer molecule equal to at least 1.2, at least some of the (meth)acrylate present in the polymerizable material has two or more (meth)acryloyl groups per monomer molecule. For example, the polymerizable material can contain a (meth)acrylate having two (meth)acryloyl groups per monomer molecule or can contain a mixture of a (meth)acrylate having two (meth)acryloyl groups per monomer molecule in combination with one or more (meth)acrylates having one (meth)acryloyl group per monomer molecule. In another example, the polymerizable material can contain a (meth)acrylate having three (meth)acryloyl groups per monomer molecule or can contain a mixture of a (meth)acrylate having three (meth)acryloyl groups per monomer molecule in combination with one or more (meth)acrylates having one (meth)acryloyl group per monomer molecule, two (meth)acryloyl groups per monomer molecule, or a mixture thereof.

Specific examples of suitable polymerizable materials with one ethylenically unsaturated group per monomer molecule include, but are not limited to, 2-hydroxyethyl (meth)acrylate, 2-hydroxypropyl (meth)acrylate, 3-hydroxypropyl (meth)acrylate, 4-hydroxybutyl (meth)acrylate, (meth)acrylonitrile, (meth)acrylamide, caprolactone (meth)acrylate, poly(alkylene oxide (meth)acrylate) (e.g., poly(ethylene oxide (meth)acrylate), poly(propylene oxide (meth)acrylate), and poly(ethylene oxide-co-propylene oxide (meth)acrylate)), alkoxy poly(alkylene oxide (meth)acrylate), (meth)acrylic acid, β-carboxyethyl (meth)acrylate, tetrahydrofurfuryl (meth)acrylate, N-vinyl pyrrolidone, N-vinylcaprolactam, N-alkyl(meth)acrylamide (e.g., N-methyl(meth)acrylamide), and N,N-dialkyl(meth)acrylamide (e.g., N,N-dimethyl(meth)acrylamide).

Suitable polymerizable materials with two ethylenically unsaturated groups per monomer molecule include, for example, alkoxylated di(meth)acrylates. Examples of alkoxylated di(meth)acrylates include, but are not limited to, poly(alkylene oxide di(meth)acrylates) such as poly(ethylene oxide di(meth)acrylates) and poly(propylene oxide di(meth)acrylates); alkoxylated diol di(meth)acrylates such as ethoxylated butanediol di(meth)acrylates, propoxylated butanediol di(meth)acrylates, and ethoxylated hexanediol di(meth)acrylates; alkoxylated trimethylolpropane di(meth)acrylates such as ethoxylated trimethylolpropane di(meth)acrylate and propoxylated trimethylolpropane di(meth)acrylate; and alkoxylated pentaerythritol di(meth)acrylates such as ethoxylated pentaerythritol di(meth)acrylate and propoxylated pentaerythritol di(meth)acrylate.

Examples of suitable polymerizable materials with three ethylenically unsaturated groups per monomer molecule include, for example, alkoxylated tri(meth)acrylates. Examples of alkoxylated tri(meth)acrylates include, but are not limited to, alkoxylated trimethylolpropane tri(meth)acrylates such as ethoxylated trimethylolpropane tri(meth)acrylates, propoxylated trimethylolpropane tri(meth)acrylates, and ethylene oxide/propylene oxide copolymer trimethylolpropane tri(meth)acrylates; and alkoxylated pentaerythritol tri(meth)acrylates such as ethoxylated pentaerythritol tri(meth)acrylates.

Suitable polymerizable materials with at least four ethylenically unsaturated groups per monomer include, for example, alkoxylated tetra(meth)acrylates and alkoxylated penta(meth)acrylates. Examples of alkoxylated tetra(meth)acrylates include alkoxylated pentaerythritol tetra(meth)acrylates such as ethoxylated pentaerythritol tetra(meth)acrylates.

In some embodiments, the polymerizable material includes a poly(alkylene oxide (meth)acrylate) having at least 2 (meth)acryloyl groups per monomer molecule. The poly(alkylene oxide (meth)acrylate) can be used alone or in combination with other monomers to provide at an average of at least 1.2 ethylenically unsaturated groups per monomer molecule. The alkoxylated portion (i.e., the poly(alkylene oxide) portion) often has at least 5 alkylene oxide units selected from ethylene oxide units, propylene oxide units, butylene oxide units, or a combination thereof. That is, each mole of the poly(alkylene oxide (meth)acrylate) contains at least 5 moles of alkylene oxide units. The plurality of alkylene oxide units facilitates the solubility of the poly(alkylene oxide (meth)acrylate) in the polar solvent. Some exemplary poly(alkylene oxide (meth)acrylates) contain at least 6 alkylene oxide units, at least 8 alkylene oxide units, at least 10 alkylene oxide units, at least 12 alkylene oxide units, at least 15 alkylene oxide units, at least 20 alkylene oxide units, or at least 30 alkylene oxide units. The poly(alkylene oxide (meth)acrylate) can contain poly(alkylene oxide) chains that are homopolymer chains, block copolymer chains, random copolymer chains, or mixtures thereof. In some embodiments, the poly(alkylene oxide) chains are poly(ethylene oxide) chains.

Any molecular weight of this poly(alkylene oxide (meth)acrylate) having at least 2 (meth)acryloyl groups can be used as long as polymeric beads can be formed from the precursor composition. The weight average molecular weight of this poly(alkylene oxide (meth)acrylate) is often no greater than 2000 g/mole, no greater than 1800 g/mole, no greater than 1600 g/mole, no greater than 1400 g/mole, no greater than 1200 g/mole, or no greater than 1000 g/mole. In other applications, however, it is desirable to include a poly(alkylene oxide (meth)acrylate) in the polymerizable material that has a weight average molecular weight greater than 2000 g/mole.

The preparation of some exemplary poly(alkylene oxide (meth)acrylates) having multiple (meth)acryloyl groups are described in U.S. Pat. No. 7,005,143 (Abuelyaman et al.) as well as in U.S. Patent Application Publication Nos. 2005/0215752 A1 (Popp et al.), 2006/0212011 A1 (Popp et al.), and 2006/0235141 A1 (Riegel et al.). Suitable poly(alkylene oxide (meth)acrylates) having an average (meth)acryloyl functionality per monomer molecule equal to at least 2 and having at least 5 alkylene oxide units are commercially available, for example, from Sartomer (Exton, Pa.) under the trade designations "SR9035" (ethoxylated (15) trimethylolpropane triacrylate), "SR499" (ethoxylated (6) trimethylolpropane triacrylate), "SR502" (ethoxylated (9) trimethylolpropane triacrylate), "SR415" (ethoxylated (20) trimethylolpropane triacrylate), and "CD501" (propoxylated (6) trimethylolpropane triacrylate) and "CD9038" (ethoxylated (30) bis-phenol A diacrylate). The number in parentheses refers to the average number of alkylene oxide units per monomer molecule. Other suitable poly(alkylene oxide (meth)acrylates) include polyalkoxylated trimethylolpropane triacrylates such as those commercially available from BASF (Ludwigshafen, Germany) under the trade designation "LAROMER" with at least 30 alkylene oxide units.

Some exemplary precursor compositions contain a poly(alkylene oxide (meth)acrylate) having at least 2 (meth)acryloyl groups per monomer molecule, having at least 5 ethylene oxide units, and having a weight average molecular weight less than 2000 g/mole. This polymerizable material can be the only polymerizable material in the precursor composition or can be combined with other monomers that are miscible in the polar solvent. Whether the poly(alkylene oxide (meth)acrylate) is the only monomer in the precursor composition or is combined with other monomers, the polymerizable material has an average functionality per monomer molecule equal to at least 1.2.

More specific exemplary precursor compositions contain a poly(ethylene oxide) (meth)acrylate having at least 2 (meth) acryloyl groups per monomer molecule, having at least 5 alkylene oxide units, and having a weight average molecular weight less than 2000 g/mole. An even more specific exemplary precursor composition can include an ethoxylated trimethylolpropane triacrylate having a weight average molecular weight less than 2000 g/mole. Often the ethoxylated trimethylolpropane triacrylate contains impurities having one (meth)acryloyl group, two (meth)acryloyl groups, or mixtures thereof. For example, commercially available "SR415" (ethoxylated (20) trimethylolpropane triacrylate), often has an average functionality per monomer molecule less than 3 (when analyzed, the average functionality per monomer molecule was about 2.5). Although impurities may be present, the average functionality per monomer molecule in the precursor composition is equal to at least 1.2.

In addition to the poly(alkylene oxide (meth)acrylate) having at least 2 (meth)acryloyl groups per monomer molecule, the precursor composition can include other monomers that are added to impart certain characteristics to the polymeric bead. In some instances, the precursor composition can contain an anionic monomer. As used herein, the term "anionic monomer" refers to a monomer that contains an ethylenically unsaturated group in addition to an acidic group selected from a carboxylic acid (i.e., carboxy) group (—COOH) or a salt thereof, a sulfonic acid group (—SO$_3$H) or a salt thereof, a sulfate group (—SO$_4$H) or a salt thereof, a phosphonic acid group (—PO$_3$H$_2$) or a salt thereof, a phosphate group (—OPO$_3$H) or a salt thereof, or a mixture thereof. Depending on the pH of the precursor composition, the anionic monomer can be in a neutral state (acidic form) or in the form of a salt (anionic form). The counterions of the anionic form are often selected from alkali metals, alkaline earth metals, ammonium ion, or an ammonium ion substituted with various alkyl groups such as a tetraalkylammonium ion.

Suitable anionic monomers having carboxy groups include, but are not limited to, acrylic acid, methacrylic acid, and various carboxyalkyl(meth)acrylates such as 2-carboxyethylacrylate, 2-carboxyethylmethacrylate, 3-carboxypropylacrylate, and 3-carboxypropylmethacrylate. Other suitable anionic monomers with carboxy groups include (meth)acryloylamino acids such as those described in U.S. Pat. No. 4,157,418 (Heilmann), incorporated herein by reference. Exemplary (meth)acryloylamino acids include, but are not limited to, N-acryloylglycine, N-acryloylaspartic acid, N-acryloyl-β-alanine, and 2-acrylamidoglycolic acid. Suitable anionic monomers having sulfonic acid groups include, but are not limited to, various (meth)acrylamidosulfonic acids such as N-acrylamidomethanesulfonic acid, 2-acrylamidoethanesulfonic acid, 2-acrylamido-2-methylpropanesulfonic acid, and 2-methacrylamido-2-methylpropanesulfonic acid. Suitable anionic monomers having phosphonic acid groups include, but are not limited to, (meth)acrylamidoalkylphosphonic acids such as 2-acrylamidoethylphosphonic acid and 3-methacrylamidopropylphosphonic acid. Suitable anionic monomers having phosphate groups include phosphates of alkylene glycol (meth)acrylates such as phosphates of ethylene glycol (meth)acrylate and phosphates of propylene glycol (meth)acrylate. Salts of any of these acidic monomers can also be used.

The anionic monomer, if present, can increase the degree of swelling of the polymeric bead. That is, the degree of swelling can often be altered by varying the amount of the anionic monomer as well as the amount of other hydrophilic monomer(s) in the precursor composition. The degree of swelling is usually proportional to the total amount of polar solvent that can be sorbed by the polymeric bead. The amount of the anionic monomer is controlled so that the average number of ethylenically unsaturated groups per monomer molecule of polymerizable material is at least 1.2. The anionic monomer is often present in an amount ranging from 0 to less than 20 weight percent based on the total weight of the polymerizable material. For example, the precursor composition can contain less than 20 weight percent anionic monomer, less than 15 weight percent anionic monomer, less than 10 weight percent anionic monomer, less than 5 weight percent anionic monomer, less than 3 weight percent anionic monomer, less than 2 weight percent anionic monomer, less than 1 weight percent anionic monomer, less than 0.5 weight percent anionic monomer, less than 0.2 weight percent anionic monomer, or less than 0.1 weight percent anionic monomer. Some precursor compositions do not contain an anionic monomer. Low levels or the complete absence of anionic monomer(s) may be preferred in compositions with certain biologically active agents. For example, certain cationic antimicrobial agents may be too tightly bound within the bead to elute as desired.

In other embodiments, the precursor composition can include a cationic monomer. As used herein, the term "cationic monomer" refers to a monomer having an ethylenically unsaturated group as well as an amino group, a salt of an amino group, or a mixture thereof. For example, the cationic monomer can be an amino (meth)acrylate or an amino (meth) acrylamide. The amino group can be a primary amino group or a salt thereof, a secondary amino group or a salt thereof, a tertiary amino group or a salt thereof, or a quaternary salt. The cationic monomers often include a tertiary amino group or a salt thereof or a quaternary amino salt. Depending on the pH of the precursor composition, some cationic monomer can be in a neutral state (basic form) or in the form of a salt (cationic form). The counterions of the cationic form are often selected from halides (e.g., bromides or chlorides), sulfates, alkylsulfates (e.g., methosulfate or ethosulfate), as well as various carboxylate anions (e.g., acetate).

Exemplary amino (meth)acrylates include N,N-dialkylaminoalkyl(meth)acrylates and N-alkylaminoalkyl(meth) acrylates such as, for example, N,N-dimethylaminoethylmethacrylate, N,N-dimethylaminoethylacrylate, N,N-diethylaminoethylmethacylate, N,N-diethylaminoethylacrylate, N,N-dimethylaminopropylmethacrylate, N,N-dimethylaminopropylacrylate, N-tert-butylaminopropylmethacrylate, and N-tert-butylaminopropylacrylate.

Exemplary amino (meth)acrylamides include, for example, N-(3-aminopropyl)methacrylamide, N-(3-aminopropyl)acrylamide, N-[3-(dimethylamino)propyl]methacrylamide, N-(3-imidazolylpropyl)methacrylamide, N-(3-imidazolylpropyl)acrylamide, N-(2-imidazolylethyl) methacrylamide, N-(1,1-dimethyl-3-imidazolylpropyl) methacrylamide, N-(1,1-dimethyl-3-imidazolylpropyl) acrylamide, N-(3-benzoimidazolylpropyl)acrylamide, and N-(3-benzoimidazolylpropyl)methacrylamide.

Exemplary monomeric quaternary salts include, but are not limited to, (meth)acrylamidoalkyltrimethylammonium salts (e.g., 3-methacrylamidopropyltrimethylammonium chloride and 3-acrylamidopropyltrimethylammonium chloride) and (meth)acryloxyalkyltrimethylammonium salts (e.g., 2-acryloxyethyltrimethylammonium chloride, 2-methacryloxyethyltrimethylammonium chloride, 3-methacryloxy-2-hydroxypropyltrimethylammonium chloride, 3-acryloxy-2-hydroxypropyltrimethylammonium chloride, and 2-acryloxyethyltrimethylammonium methyl sulfate).

Other exemplary monomeric quaternary amino salts include a dimethylalkylammonium group with the alkyl group having 2 to 22 carbon atoms or 2 to 20 carbon atoms. That is, the monomer includes a group of formula $-\text{N}(\text{CH}_3)_2 (\text{C}_n\text{H}_{2n+1})^+$ where n is an integer having a value of 2 to 22. Exemplary monomers include, but are not limited to monomers of the following formula

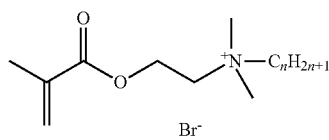

where n is an integer in the range of 2 to 22. The synthesis of these monomers is described in U.S. Pat. No. 5,437,932 (Ali et al.). These monomers can be prepared, for example, by combining dimethylaminoethylmethacrylate salt, acetone, 1-bromoalkane having 2 to 22 carbon atoms, and optionally, an antioxidant. The resulting mixture may be stirred for about 16 hours at about 35° C. and then allowed to cool to room temperature. The resulting white solid precipitate may then be isolated by filtration, washed with cold ethyl acetate, and dried under vacuum at 40° C.

Some cationic monomers, such as those having a quaternary amino group, can impart antimicrobial properties to the polymeric bead. The cationic monomer is often present in an amount ranging from 0 to 50 weight percent based on the total weight of the polymerizable material. For example, the precursor composition can contain up to 40 weight percent, up to 30 weight percent, up to 20 weight percent, up to 15 weight percent, or up to 10 weight percent. The precursor composition in some examples contain at least 0.5 weight percent, at least 1 weight percent, at least 2 weight percent, or at least 5 weight percent cationic monomer. Some precursor compositions do not contain a cationic monomer.

Some exemplary polymerizable materials contain only nonionic monomers. That is, the polymerizable material is substantially free of both anionic monomers and cationic monomers. As used herein with reference to the anionic or cationic monomers, "substantially free" means that the polymerizable material contains less than 1 weight percent, less than 0.5 weight percent, less than 0.2 weight percent, or less than 0.1 weight percent anionic monomer or cationic monomer based on the weight of the polymerizable material.

In some embodiments, the precursor compositions contain (a) greater than 10 weight percent to 85 weight percent polar solvent based on a total weight of the precursor composition and (b) 15 weight percent to less than 90 weight percent polymerizable material based on a total weight of the precursor composition. The polymerizable material is miscible in the polar solvent and has an average number of ethylenically unsaturated groups per monomer molecule equal to at least 1.2. The polymerizable material includes (i) a poly(alkylene oxide (meth)acrylate) having at least 2 (meth)acryloyl groups and having at least 5 alkylene oxide units; and (ii) 0 to less than 20 weight percent anionic monomer based on the total weight of polymerizable material in the precursor composition, wherein the anionic monomer has an ethylenically unsaturated group in addition to an acidic group, a salt of an acidic group, or a mixture thereof.

In addition to the polar solvent and the polymerizable material, the precursor composition can include one or more optional additives such as processing agents, active agents, or mixtures thereof. Any of these optional additives can be dissolved in the precursor composition or dispersed in the precursor composition.

As used herein, the term "processing agent" refers to a compound or mixture of compounds that is added primarily to alter the physical or chemical characteristics of either the precursor composition or the polymeric material. That is, the processing agent is added for the purpose of altering the precursor composition or facilitating the formation of the polymeric material. If added, the processing agent is typically added to the precursor composition. These processing agents are typically not considered to be active agents.

Suitable processing agents include, but are not limited to, rheology modifiers such as polymeric thickeners (such as gum, cellulose, pectin, and the like) or inorganic thickeners (such as clays, silica gels, and the like), surfactants that modify the surface tension, emulsifiers that stabilize the precursor composition, solubilizers that enhance the solubility of the monomers in the polar solvent, initiators to facilitate the polymerization reaction of the polymerizable material, chain transfer or retarding agents, binders, dispersants, fixatives, foaming agents, flow aids, foam stabilizers, foam boosters, gellants, glossers, propellants, waxes, compounds to depress the freezing point and/or increase the boiling point of the precursor composition, and plasticizers.

Any optional processing agent is typically present in an amount no greater than 20 weight percent, no greater than 15 weight percent, no greater than 10 weight percent, no greater than 8 weight percent, no greater than 6 weight percent, no greater than 4 weight percent, no greater than 2 weight percent, no greater than 1 weight percent, or no greater than 0.5 weight percent based on the total weight of the precursor composition.

One exemplary processing agent is an initiator. Most precursor compositions include an initiator for the free-radical polymerization reaction. The initiator can be a photoinitiator, a thermal initiator, or a redox couple. The initiator can be either soluble in the precursor composition or dispersed in the precursor composition.

An example of a suitable soluble photoinitiator is 2-hydroxy-1-[4-(2-hydroxyethoxy)phenyl]-2-methyl-1-propanone, which is commercially available under the trade designation "IRGACURE 2959" from Ciba Specialty Chemicals (Tarrytown, N.Y.). An example of a suitable dispersed photoinitiator is alpha, alpha-dimethoxy-alpha-phenylacetophenone, which is commercially available under the trade designation "IRGACURE 651" from Ciba Specialty Chemicals. Other suitable photoinitiators are the acrylamidoacetyl photoinitiators, described in U.S. Pat. No. 5,506,279, that contain a polymerizable group as well as a group that can function as an initiator. The initiator is usually not a redox initiator as used in some polymerizable compositions known in the art. Such initiators could react with bioactive agents, if present.

Suitable thermal initiators include, for example, azo compounds, peroxides or hydroperoxides, persulfates, or the like. Exemplary azo compounds include 2,2'-azobis[2-(2-imidazolin-2-yl)propane] dihydrochloride, 2,2'-azobis(2-amidinopropane)dihydrochloride, and 4,4'-azobis-(4-cyanopentanoic acid). Examples of commercially available thermal azo compound initiators include materials available from DuPont Specialty Chemical (Wilmington, Del.) under the "VAZO" trade designation such as "VAZO 44", "VAZO 56", and "VAZO 68". Suitable peroxides and hydroperoxides include acetyl peroxide, t-butyl hydroperoxide, cumene hydroperoxide, and peroxyacetic acid. Suitable persulfates include, for example, sodium persulfate and ammonium persulfate.

In other examples, the free radical initiator is a redox couple such as ammonium or sodium persulfate and N,N,N', N'-tetramethyl-1,2-diaminoethane; ammonium or sodium persulfate and ferrous ammonium sulfate; hydrogen peroxide and ferrous ammonium sulfate; cumene hydroperoxide and N,N-dimethylaniline; or the like.

In some embodiments, the precursor composition includes only the polymerizable material, the polar solvent, and an initiator such as a photoinitiator. In most embodiments, the initiator is present in an amount equal to no more than 4 weight percent, no greater than 3 weight percent, no more than 2 weight percent, no more than 1 weight percent, or no more than 0.5 weight percent based on the total weight of the precursor composition.

The precursor composition can include one or more optional active agents. The active agent provides some added functionality to the polymeric bead. The polymeric bead functions as a carrier for the active agent. If present, the active agents are usually present in an amount no greater than 30 weight percent, no greater than 25 weight percent, no greater than 20 weight percent, no greater than 15 weight percent, no greater than 10 weight percent, or no greater than 5 weight percent based on a total weight of the precursor composition.

In some embodiments, the active agent can migrate into and out of the polymeric bead. In other embodiments, the active agent tends to be stationary and remain within the polymeric bead. For example, the molecular size of the active agent may prevent elution or diffusion of the active agent out of the bead. In another example, the active agent may be attached to the bead with a covalent or ionic bond. Active agents optionally can have one or more ethylenically unsaturated groups that can react with other ethylenically unsaturated groups to become part of the polymeric material or to become attached to the polymeric material in the bead.

Some active agents are biologically active agents. As used herein, the terms "biologically active agent" and "bioactive agent" are used interchangeably and refer to a compound or mixture of compounds that has some known effect on living systems such as, for example, a bacteria or other microorganisms, plant, fish, insect, or mammal. The bioactive agent is added for the purpose of affecting the living system such as affecting the metabolism of the living system. Examples of bioactive agents include, but are not limited to, medicaments, herbicides, insecticides, antimicrobial agents, disinfectants and antiseptic agents, local anesthetics, astringents, antifungal agents, antibacterial agents, growth factors, vitamins, herbal extracts, antioxidants, steroids or other anti-inflammatory agents, compounds that promote wound healing, vasodilators, exfoliants such as alpha-hydroxy acids or beta-hydroxy acids, enzymes, nutrients, proteins, and carbohydrates. Still other bioactive agents include artificial tanning agents, tanning accelerators, skin soothing agents, skin tightening agents, anti-wrinkle agents, skin repair agents, sebum inhibiting agents, sebum stimulators, protease inhibitors, anti-itch ingredients, agents for inhibiting hair growth, agents for accelerating hair growth, skin sensates, anti-acne treatments, depilating agents, hair removers, corn removers, callus removers, wart removers, sunscreen agents, insect repellants, deodorants and antiperspirants, hair colorants, bleaching agents, and anti-dandruff agents. Any other suitable bioactive agent known in the art can be used.

Other active agents are not biologically active. These active agents are added to provide some non-biological functionality to the polymeric bead. That is, these active agents are not added for the purpose of affecting a living system such as affecting the metabolism of the living system. Suitable active agents, for example, can be selected to alter the odor, charge, color, density, pH, osmolarity, water activity, ionic strength, or refractive index of the polymeric bead. The active agent can also be selected to provide a reactive group or compound. Examples of non-biologically active agents include emulsifiers or surfactants (including anionic surfactants, cationic surfactants, zwitterionic surfactants, non-ionic surfactants, and combinations thereof), pigments, inorganic oxides (such as silicon dioxide, titania, alumina, and zirconia), fragrances such as aromatherapy agents and perfumes, odor absorbing agents, humectants, lubricants, dyes, bleaching or coloring agents, flavorings, decorative agents such as glitter, emollients, acids, bases, buffers, indicators, soluble salts, chelating agents, and the like. Some humectants that are liquids at room temperature that are miscible with water (e.g., glycols and other polyols) in the amounts used are considered to be part of the polar solvent when the percent composition of the swollen polymeric bead or dried polymeric bead is calculated.

In some embodiments, the active agent is an indicator. Any suitable chemistry can be used for the indicator. The indicator can detect, for example, a specific pH range or the presence of a specific class of compounds. The presence of some specific classes of compounds can result in a color change. Ninhydrin, for example, can be used to detect the presence of a protein or amino group. The indicator can also be a typical pH indicator such as methyl blue or phenolphthalein.

Nanoparticles of inorganic oxides can be added to the polymeric beads to increase the refractive index of the beads. For example, the polymeric beads can be loaded with zirconia nanoparticles or titania nanoparticles. Zirconia nanoparticles can be prepared using the methods described, for example, in U.S. Pat. No. 6,376,590 (Kolb et al.) and U.S. Patent Publication No. 2006/0148950A1 (Davidson et al.).

Any of the active agents may have a polymerizable group. The use of a polymerizable group on the active agent can be used to prevent the migration of the active agent out of the polymeric bead. Cationic monomers having an ethylenically unsaturated group as well as a quaternary amino group may function as an antimicrobial agent and can be included in the polymerizable material of the precursor composition. The cationic monomer is often a (meth)acrylate having a quaternary amino group.

Because the polymeric beads typically have unreacted polymerizable groups, the polymeric beads can be reacted post-formation with active agents having polymerizable groups. For example, a cationic monomer having an ethylenically unsaturated group and a quaternary amino group can be reacted with the polymeric beads having unreacted ethylenically unsaturated groups. A mixture containing the polymeric beads, the cationic monomer, and a photoinitiator can be exposed to actinic radiation to react the ethylenically unsaturated group of the cationic monomer with an unreacted ethylenically unsaturated group of the polymeric bead. The reaction product is a polymeric bead with attached quaternary amino groups.

The method of forming polymeric beads includes providing a precursor composition and forming droplets of the precursor composition that are totally surrounded by a gas phase.

The method further includes exposing the droplets to radiation for a time sufficient to at least partially polymerize the polymerizable material in the precursor composition and to form a first swollen polymeric bead. The droplets can fall under the force of gravity past a radiation source or can be blown upward as a spray.

Any of the precursor compositions described above can be used in the method of forming polymeric beads. The polymerizable material included in the precursor composition has an average number of ethylenically unsaturated groups per monomer molecule equal to at least 1.2. In some embodiments, the polymerizable material includes a poly(alkylene oxide (meth)acrylate) having at least 2 (meth)acryloyl groups and having at least 5 alkylene oxide units. The polymerizable material can optionally include 0 to 20 weight percent of an anionic monomer based on the total weight of polymerizable material in the precursor composition.

Upon exposure to radiation, the polymerizable material within the precursor composition undergoes a free-radical polymerization reaction. As used herein, the term "radiation" refers to actinic radiation (e.g., radiation having a wavelength in the ultraviolet or visible region of the spectrum), accelerated particles (e.g., electron beam radiation), thermal (e.g., heat or infrared radiation), or the like. The radiation is often actinic radiation or accelerated particles, because these energy sources tend to provide good control over the initiation and rate of polymerization. Additionally, actinic radiation and accelerated particles can be used for curing at relatively low temperatures. This avoids degrading components that might be sensitive to the relatively high temperatures that might be required to initiate the polymerization reaction with thermal radiation. Any suitable actinic radiation sources that can produce energy in the desired region of the electromagnetic spectrum can be used. Exemplary sources of actinic radiation include mercury lamps, xenon lamps, carbon arc lamps, tungsten filament lamps, lasers, sunlight, and the like.

Figure 2:
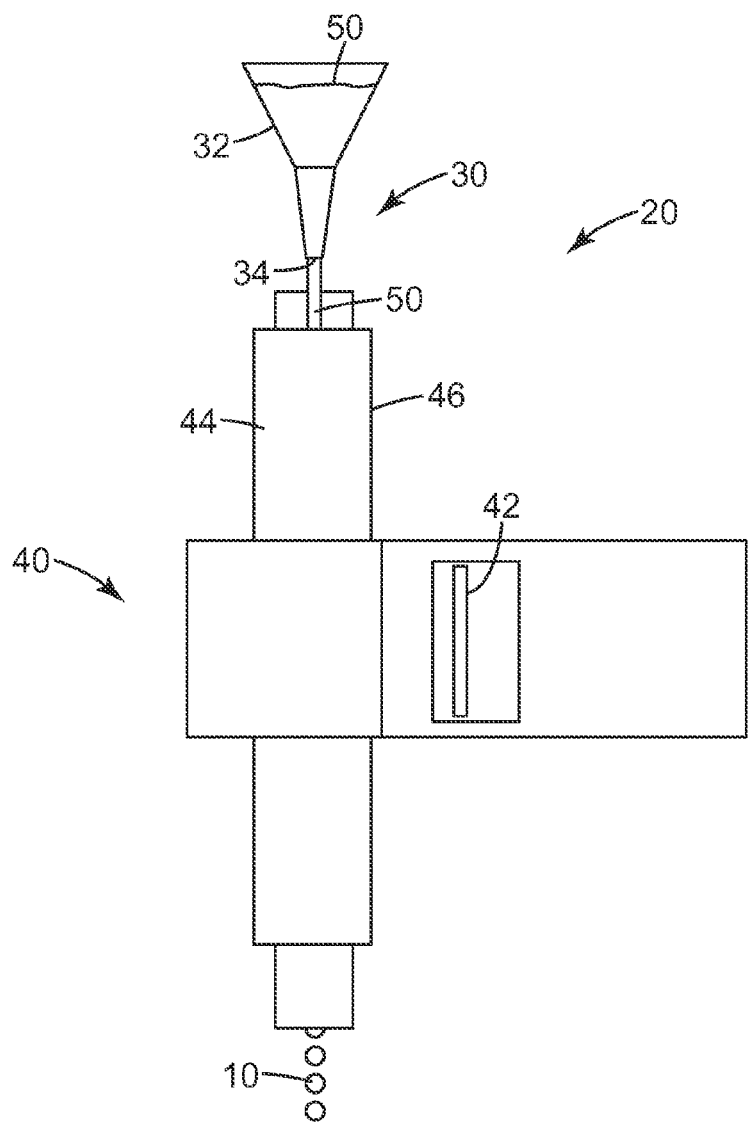
FIG. 2 is a schematic diagram of a first embodiment of a process and equipment for making the polymeric beads.

FIG. 2 is a schematic representation of one exemplary process for making polymeric beads. Process 20 includes a feed system 30 and a polymerization system 40. Precursor composition 50, which contains polymerizable material and a polar solvent, is provided to feed system 30. Feed system 30 passes the precursor composition 50 to polymerization system 40. Within polymerization system 40, the polymerizable material in the precursor composition 50 is exposed to radiation and undergoes a free-radical polymerization reaction to form polymeric material. Each of feed system 30 and polymerization system 40 of process 20 can include various elements.

Feed system 30 includes a receiver 32 having an outlet 34. Receiver 32 may be a pot, vessel, hopper, hose, funnel, or other element into which a volume of the precursor composition 50 can be poured or otherwise added. Receiver 32 may be metal, plastic, glass, or any other suitable material; preferably, precursor composition 50 does not adhere to or react with receiver 32 and can be easily removed from receiver 32. Outlet 34 may be as simple as an aperture or hole in receiver 32, or may be a separate element, such as an ultrasonic atomizer. In the embodiment shown in FIG. 2, outlet 34 is merely an aperture in receiver 32. The outlet 34 facilitates the formation of droplets of the precursor composition 50.

Polymerization system 40 includes a radiation source 42 and a shielding device 44. The shielding device 44 is often present to direct the radiation from source 42 to the desired location and to shield persons or equipment that may be in close proximity. Polymerization system 40, in this embodiment, also includes a management element 46 that protects or isolates precursor composition 50 (e.g., droplets of the precursor composition 50) from any high velocity air flow that may occur from radiation source 42. The management element 46 can allow control of the local environment where polymerization occurs. That is, management element 46 can be used to control the composition of the gas phase that totally surrounds droplets of precursor composition 50 as the droplets are exposed to radiation source 42.

The radiation source 42 may be a single radiation source or a plurality of radiation sources that are the same or different. Radiation source 42 provides energy such as infrared radiation, visible radiation, ultraviolet radiation, electron beam radiation, microwave radiation, or radio frequency radiation. The particular energy source used will depend upon the particular precursor composition 50. Suitable non-ionizing radiation sources include continuous and pulsed sources and may be broadband or narrowband sources such as monochromatic sources. Exemplary non-ionizing radiation sources include, but are not limited to, mercury lamps (such as low, medium, and high-pressure versions as well as their additive or doped versions), fluorescent lamps, germicidal lamps, metal halide lamps, halogen lamps, light emitting diodes, lasers, excimer lamps, pulsed xenon lamps, tungsten lamps, and incandescent lamps. Infrared radiation sources and microwave radiation sources may be used, as well as ionizing radiation sources such as electron beams. A combination of radiation sources may also be used.

In some exemplary methods, electromagnetic radiation having a wavelength in the range of 100 to 1000 nanometers, 100 to 800 nanometers, or 100 to 700 nanometers can be used. In some methods, ultraviolet radiation having a wavelength in the range of 100 to 400 nanometers or 200 to 400 nanometers can be used. Ultraviolet radiation at wavelengths below 200 nm from excimer sources, for example, can be used. In many embodiments, radiation source 42 is a high-radiance ultraviolet source, such as a medium-pressure mercury lamp of at least 100 W/inch (40 W/cm). Low-radiance lamps, including low-pressure mercury lamps such as germicidal lamps, can also be used.

Shielding device 44 can be any suitable shape and material to inhibit radiation from source 42 from contacting persons or equipment in close proximity. Shielding devices 44 are well known in the art of radiation.

Management element 46, if present, can be any suitable shape and material to isolate or protect the fall or flow of precursor composition 50 past radiation source 42. In most processes, management element 46 is transparent or at least partially transparent to radiation from source 42. An example of element 46 is a quartz tube through which droplets of the precursor composition 50 are passed.

During production of beads 10, precursor composition 50 is delivered (e.g., poured) into receiver 32, for example through an open top, and is expelled through outlet 34 to form droplets. Due to natural fluid dynamic properties, precursor composition 50 forms droplets prior to falling or as it falls (e.g., free-falls) through polymerization system 40, in particular, through management element 46 past radiation source 42.

The droplet size is often controlled to have a diameter in the range of 500 to 3000 micrometers. The droplet size can be adjusted by altering the outlet 34, the viscosity of precursor composition 50, or both. Precursor composition 50 passes through polymerization system 40 generally affected only by natural forces such as gravity, and optionally air currents, thermal convective currents, surface tension or the like. In some embodiments, an upward gas stream may be used to slow the fall of precursor composition 50 through polymerization system 40. The duration of the precursor composition 50 within polymerization system 40 or the time of exposure of precursor composition 50 to radiation is generally no more than 10 seconds, no more than 5 seconds, no more than 3 seconds, no more than 2.5 seconds, no more than 2 seconds, no more than 1 second, or no more than 0.5 second.

The droplets of the precursor composition 50 are totally surrounded by a gas phase. Typically, the atmosphere through which precursor composition 50 falls is ambient air, however, other gaseous atmospheres such as an inert atmosphere can be used. Suitable inert atmospheres can include, for example, argon, helium, nitrogen, or mixtures thereof. From polymerization system 40, swollen polymeric beads 10 are obtained. There is a minimum distance from outlet 34 to radiation source 42 required when the composition is dependent upon surface tension forces to cause droplets to form from the falling liquid stream. This stream instability is well known in the art.

FIG. 3 is a schematic illustration of another exemplary method of making polymeric beads. In the most basic form, process 120 includes a feed system 130 and a polymerization system 140. Precursor composition 50, as described above, is provided to feed system 130, which passes it to polymerization system 140. After droplets of the precursor composition 50 are passed through polymerization system 140, homogeneous, and swollen polymeric beads are obtained. Each of feed system 130 and polymerization system 140 of process 120 include various elements.

Feed system 130, which can be similar to feed system 30, includes a receiver 132 having an outlet 134. Connected to outlet 134 is a spray head such as an ultrasonic atomizer 136, which creates small droplets (e.g., about 10 to 500 micrometers in diameter) of precursor composition 50. The droplet size depends on the atomizer used, the viscosity of the precursor composition, and other factors. An optional pump 135 is shown, which can facilitate movement of precursor composition 50 to atomizer 136.

Polymerization system 140 can be similar to system 40 described above, having a radiation source 142 and a shielding device 144. In this illustrated example, shielding device 144 also functions as a management element to direct composition 50 through polymerization system 140.

During production of beads 10, precursor composition 50 is provided from receiver 132 via outlet 134, and is then pressurized by pump 135. Composition 50 is expelled by a mechanical means, such as an atomizer 136. Atomizer 136 forms a spray of droplets that fall through polymerization system 140 in the ambient atmosphere. The droplets typically have a diameter in the range of 10 micrometers to 500 micrometers. Polymeric beads are formed from the droplets of precursor composition 50.

Any other means of forming droplets can be used. Other suitable droplet forming means include, for example, misters, foggers, high-volume low-pressure sprayers, spray dryers and numerous types of spray nozzles including ultrasonic atomizers and piezo-electric droplet generators.

The processes described above illustrate precursor composition 50 falling vertically from a receiver through a polymerization system. Another alternate process configuration may have precursor composition 50 being expelled, for example, horizontally from a receiver, so that the path of precursor composition 50 prior to and/or through the polymerization system includes a horizontal vector.

For a given method of droplet formation, the particle size distribution may be broad or narrow. Narrow particle size distributions can be monodisperse or nearly monodisperse. As an example, when ultrasonic atomization is used to generate liquid droplets, a mean diameter of approximately 50 micrometers may be obtained but the bead size distribution may range from about 1 micrometer to about 100 micrometers. Other droplet formation techniques will provide different bead size distributions. For applications where a narrow size distribution of beads is desired, more controlled drop formation methods may be used or additional post-process screening can be done to narrow the size distribution, as is known to those skilled in the art.

Polymeric beads are formed by subjecting droplets of the precursor composition to radiation resulting in the free-radical polymerization of the polymerizable material. Because the precursor composition includes polar solvent in addition to the polymerizable material, the polymeric beads are swollen with the polar solvent. The polymeric bead can be described as a swollen bead, a hydrogel bead, a polymeric bead swollen with solvent, or a swollen polymeric bead. All these terms may be used interchangeably herein.

The polymeric material in the swollen polymeric bead is crosslinked but can contain unreacted polymerizable or reactive groups. The unreacted polymerizable groups typically include ethylenically unsaturated groups capable of further free-radical reactions. Other types of polymerizable groups such as hydroxyl groups or amino groups can be present that are capable of condensation reactions or nucleophilic substitution reactions.

The swollen polymeric beads generally include 15 weight percent to less than 90 weight percent polymeric material based on the weight of the swollen polymeric bead. If less than 15 weight percent of the swollen polymeric bead is polymeric material, there may not be sufficient polymeric material present to form a well-shaped bead. If 90 weight percent or greater of the swollen polymeric bead is polymeric material, the ability of a dried polymeric bead to sorb a sorbate may be undesirably low.

In some exemplary swollen polymeric beads, at least 15 weight percent, at least 20 weight percent, at least 25 weight percent, at least 30 weight percent, at least 40 weight percent, or at least 50 weight percent of the swollen polymeric beads are polymeric material. Up to 85 weight percent, up to 80 weight percent, or up to 70 weight percent of the swollen polymeric beads are polymeric material. For example, the swollen polymeric beads can contain 15 to 85 weight percent, 20 to 80 weight percent, 30 to 80 weight percent, or 40 to 80 weight percent polymeric material.

The amount of polar solvent within the swollen polymeric beads is often in the range of greater than 10 weight percent to 85 weight percent of the swollen polymeric bead. If the amount of polar solvent is greater than 85 weight percent, there may not be sufficient polymeric material present to form a well-shaped bead. If the amount of the polar solvent is not greater than 10 weight percent of the swollen polymeric bead, the ability of the dried polymeric bead to sorb additional liquids may be undesirably low. Any polar solvent included in the swollen polymeric bead is usually not covalently bonded to the matrix. In some exemplary swollen polymeric beads, at least 15 weight percent, at least 20 weight percent, at least 25 weight percent, at least 30 weight percent, or at least 40 weight percent of the swollen polymeric beads are polar solvents. Up to 85 weight percent, up to 80 weight percent, up to 70 weight percent, up to 60 weight percent, or up to 50 weight percent of the swollen polymeric beads are polar solvents.

In some embodiments, the swollen polymeric beads can also contain an active agent. These active agents can be present in the precursor composition used to prepare the swollen polymeric bead. Alternatively, the swollen polymeric beads can be dried and swollen a second time with a sorbate.

That is, the dried polymeric bead can sorb the sorbate to form a second swollen polymeric bead. The sorbate often includes an active agent. The active agent can be a biologically active agent, a non-biologically active agent, or a mixture thereof. Suitable active agents are described above.

When included in the precursor composition, the active agents are preferably stable and/or resistant to the radiation used to polymerize the material. Active agents that are not stable or resistant to radiation may fare better if added after formation of the polymeric bead (i.e., the polymeric bead can be dried and then exposed to a sorbate that includes the active agent). Unlike the active agents that often can be added to either to the precursor composition or after formation of the polymeric bead, the processing agents are typically included only in the precursor composition.

The amount of the active agent can be in the range of 0 to 30 weight percent based on the weight of the swollen polymeric bead. In some exemplary swollen polymeric beads, the amount of the active agent is no greater than 20 weight percent, no greater than 15 weight percent, no greater than 10 weight percent, no greater than 5 weight percent, no greater than 3 weight percent, or no greater than 1 weight percent of the swollen polymeric bead.

Some exemplary swollen polymeric beads contain 15 weight percent to less than 90 weight percent polymeric material, greater than 10 weight percent to 85 weight percent polar solvent, and 0 to 30 weight percent active agent based on a total weight of the swollen polymeric beads.

The swollen polymeric beads are usually homogeneous and do not contain discernible internal pores or internal channels. The polymeric matrix, which includes the polar solvent and polymeric material, it usually present as a single phase in the swollen polymeric bead, with no discernible boundary between the solvent and the polymeric material. If an active agent is present, however, the active agent may or may not be distributed homogeneously throughout the polymeric bead. Further, the active agent may be present in a separate phase from the polymeric matrix.

Figure 6A:
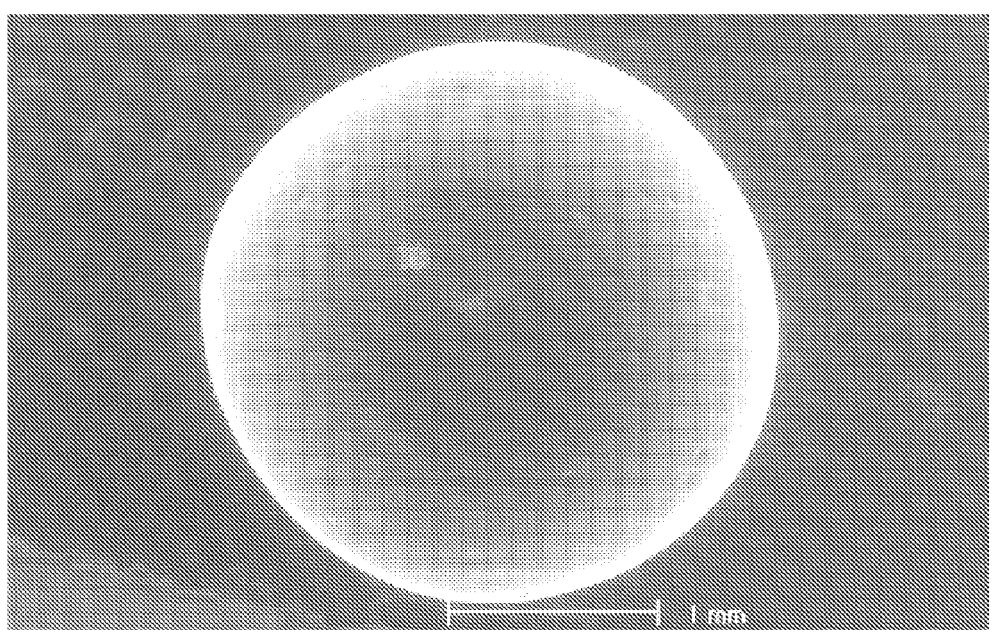
FIG. 6A is an environmental scanning electron micrograph of an exemplary swollen polymeric bead at a magnification of 50 times.

Generally, the polymeric beads (particularly those without an active agent) have no discernible porosity or voids when viewed under a microscope such as an environmental scanning electron microscope with magnification up to 50 times (see FIG. 6A). The polymeric beads often have no discernible porosity or voids when viewed under a field emission scanning electron microscope with a magnification up to 50,000 times.

Swollen polymeric beads that are prepared without the use of opaque components that might scatter light can be clear or transparent, with little or no opacity or haziness. In some embodiments, swollen polymeric beads that are clear are preferred. In other embodiments, clarity is not necessary and various components can be added that may affect the appearance of the polymeric beads.

The term "transparent" as used in reference to the polymeric beads, means that the beads do not scatter visible light in an amount that can be visually detected. In some embodiments, air may be entrained in the polymeric beads, which can create opacity at the phase boundaries; however, this is not phase-separation of the polymeric material in the polar solvent. Compositions are considered transparent if at least 85 percent of light having a wavelength of 550 nanometers is transmitted through a film of the cured precursor composition having a thickness of 1 millimeter. These films can be cast onto glass or other non-interfering substrates. In some embodiments, at least 88 percent, at least 90 percent, at least 95 percent of light having a wavelength of 550 nanometers is transmitted through this film.

The haze or opacity can be characterized using a haze meter, such as a BYK-Gardner Hazegard Plus hazemeter, which has a broadband light source. The transmittance through this same film prepared from the precursor composition is at least 85 percent, at least 88 percent, at least 90 percent, or at least 95 percent with haze being less than 10 percent, less than 8 percent, less than 5 percent, or less than 3 percent. Haziness, in many embodiments, is indicative of phase-separation.

The beads may be rigid or elastomeric and may or may not be easily crushed (e.g., friable). A higher content of polymeric material tends to increase the modulus and crush strength of the swollen polymeric bead. A greater amount of crosslinking achieved by using a precursor composition with a higher average functionality also tends to increase the modulus and crush strength of the polymeric beads. The average functionality refers to the average number of polymerizable groups (ethylenically unsaturated groups) per monomer molecule.

The polymer beads can have a wide variety of sizes. The diameter of the beads depends on the exact method used to generate the liquid droplets of the precursor composition prior to radiation curing and can range from less than one micrometer to several thousand micrometers. Particularly suitable bead diameters are in the range of 1 to about 5000 micrometers, in the range of 1 to 1000 micrometers, in the range of 10 to 1000 micrometers, or in the range of 100 to 1000 micrometers.

In some embodiments of the polymeric beads and the methods of making the polymeric beads, at least a portion of the polar solvent can be removed from the first swollen polymeric bead to form a dried bead. The term "dried bead" and "dried polymeric bead" are used interchangeably herein. The dried bead can then be contacted with a sorbate for a time sufficient for the dried bead to sorb at least a portion of the sorbate. That is, a first swollen polymeric bead can be dried to form a dried polymeric bead that can then be contacted with a sorbate to form a second swollen polymeric bead. The sorbate can contain at least one active agent. In addition to the active agent, the sorbate can include a fluid such as a liquid or a supercritical fluid. Some exemplary sorbates include an active agent plus a polar solvent.

As used herein, the term "sorb" refers to adsorb, absorb, or a combination thereof. Likewise, the term "sorption" refers to adsorption, absorption, or a combination thereof. The sorption can be a chemical process (i.e., a chemical reaction occurs), a physical process (i.e., no chemical reaction occurs), or both. The term "sorbate" refers to a composition that can be sorbed by polymeric beads such as dried polymeric beads.

More specifically, a method of making a polymeric bead that includes an active agent is provided. The method includes forming a precursor composition containing (a) a polar solvent and (b) polymerizable material that is miscible with the polar solvent. The polymerizable material is capable of free-radical polymerization and has an average number of ethylenically unsaturated groups per monomer molecule greater than 1.2. The method further includes forming a droplet of the precursor composition, wherein the droplet is totally surrounded by a gas phase. The droplet is exposed to radiation for a time sufficient to at least partially polymerize the polymerizable material and to form a first swollen polymeric bead. The method further includes removing at least a portion of the polar solvent from the first swollen polymeric bead to form a dried bead. The dried bead is then contacted with a sorbate for a time sufficient for the dried bead to sorb at least a portion of the sorbate and to form a second swollen polymeric bead. The sorbate typically contains an active agent.

The active agent can be a biologically active agent, a non-biologically active agent, or a mixture thereof.

This method often includes forming a precursor composition containing (a) greater than 10 weight percent to 85 weight percent polar solvent based on a total weight of the precursor composition and (b) 15 weight percent to less than 90 weight percent polymerizable material based on the total weight of the precursor composition. The polymerizable material is miscible with the polar solvent. The polymerizable material is capable of free-radical polymerization and has an average number of ethylenically unsaturated groups per monomer molecule equal to at least 1.2. The polymerizable material includes a poly(alkylene oxide (meth)acrylate) having at least 2 (meth)acryloyl groups and having at least 5 alkylene oxide units. The polymerizable material also can include 0 to less than 20 weight percent of an anionic monomer. The anionic monomer contains an ethylenically unsaturated group in addition to an acidic group, a salt of an acidic group, or a mixture thereof. The droplet is exposed to radiation for a time sufficient to at least partially polymerize the polymerizable material and to form a first swollen polymeric bead. The method further includes removing at least a portion of the polar solvent from the first swollen bead to form a dried bead. The dried bead is then contacted with a sorbate for a time sufficient for the dried bead to sorb at least a portion of the sorbate and to form a second swollen polymeric bead. The sorbate typically contains an active agent. The active agent can be a biologically active agent, a non-biologically active agent, or a mixture thereof.

The amount of polar solvent removed from the first swollen polymeric bead to form a dried bead can be any amount desired. The dried bead often contains at least a small amount of polar solvent remaining in the polymeric material. Additionally, if the dried bead will be contacted with a sorbate to sorb an active agent into or onto the polymeric beads, the amount of polar solvent present in the dried bead is generally no more than 25 weight percent based on the weight of the dried polymeric bead. The amount of polar solvent in the dried bead can be less than 20 weight percent, less than 15 weight percent, less than 10 weight percent, less than 5 weight percent, less than 2 weight percent, or less than 1 weight percent of the weight of the dried polymeric bead. Generally, the more solvent removed from the first swollen bead, the greater is the amount of the sorbate that can be sorbed by the dried bead.

The first swollen polymeric bead shrinks when the polar solvent is removed and may resemble collapsed or deflated spheres or ellipsoids; some dried polymeric beads may have an oval or elliptical cross-section. The cross-sectional shape of the dried polymeric bead will depend on the cross-sectional shape of the first swollen polymeric bead. The amount of shrinkage depends on the volume of polar solvent initially present in the first swollen polymeric bead and the extent to which it is removed by drying.

Figure 6B:
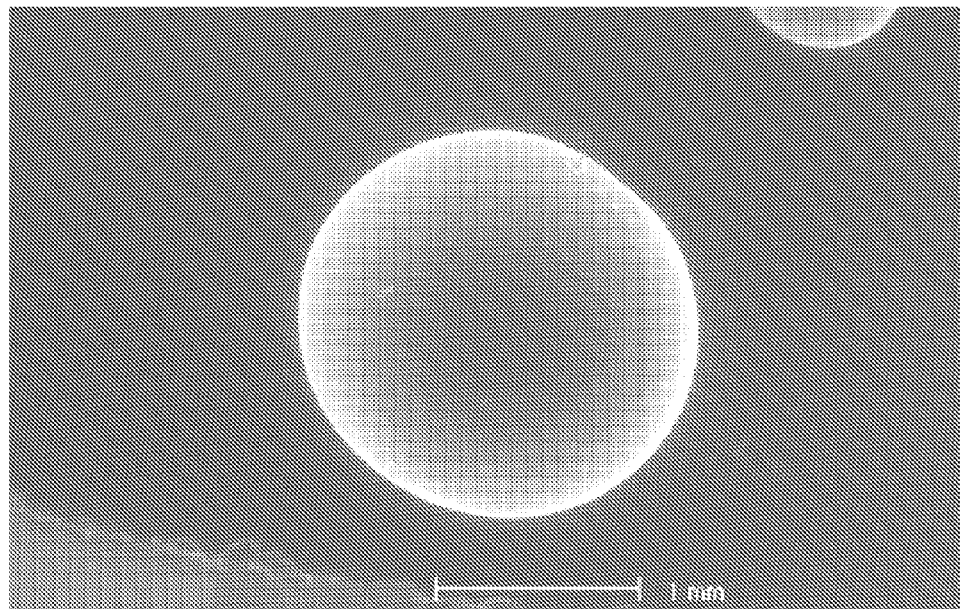
FIG. 6B is an environmental scanning electron micrograph of an exemplary dried polymeric bead at a magnification of 50 times.

The dried polymeric bead (particularly in the absence of an active agent) generally remains homogeneous and does not contain macroscopic (i.e., greater than 100 nm) internal pores or channels. Generally, the polymeric beads have no discernible porosity or voids when viewed under a microscope. For example, there are no discernible pores when the polymeric beads are viewed using environmental scanning electron microscopy with magnification up to 50 times (see FIG. 6B). Some polymeric beads have no discernible pores when viewed using field emission scanning electron microscopy with magnification up to 50,000 times. The dried bead may have high modulus, high crush strength, or a combination thereof. These properties can be similar to or greater than those of the swollen polymeric bead.

A swollen polymeric bead can be dried (i.e., the swollen bead can have at least a portion of the polar solvent removed) by any of a variety of methods including heating in a conventional oven such as a convection oven, heating in a microwave oven, air-drying, freeze-drying, or vacuum-drying. The optimal method for drying a given bead composition is dependent on the identity and amount of the polar solvent present in the swollen polymeric bead as well as the heat stability of components in the bead such as bioactive agents. When water is present, preferred drying methods include conventional ovens such as convection ovens, microwave ovens, vacuum ovens, and freeze-drying. For water, suitable temperatures for drying at atmospheric pressure are often close to or exceeding 100° C. In some cases it may be desirable to heat the dried bead to higher temperatures. This may improve bead strength through condensation or other chemical reactions. For example, the beads can be heated to greater than 140° C., greater than 160° C., or even greater than 180° C. The polymeric beads do not coalesce when dried to form, for example, a film or sheet. Rather, the dried beads tend to remain as separate particles.

The dried bead can be readily swollen again, for example, by impregnating with a sorbate, back to its swollen state that can approximate the original size. Typically, the volume of sorbate that can be sorbed by the dried bead to form a second swollen polymeric bead is nearly equal to the volume of polar solvent and other non-polymerized components removed from the first swollen polymeric bead during the drying process. In cases where the polar solvent present in the precursor composition and in the resulting first swollen bead is different than the solvent in the sorbate used to swell the bead a second time (e.g., swell a dried bead), the dried polymeric bead may swell very little or may swell beyond its original, as polymerized, dimensions.

Dried beads can be loaded with an active agent, especially those that are sensitive to the heat or radiation encountered during the formation of the swollen polymeric bead such as medicaments, pharmaceuticals, insecticides, herbicides, dyes, fragrances, or mixtures thereof. To provide a bead with an active agent, the dried bead is contacted with a sorbate that contains the active agent. If the active agent is not a liquid, the sorbate typically also contains a fluid such as a polar solvent or supercritical fluid (e.g., carbon dioxide). The sorbate can be a solution, suspension, or dispersion. In many embodiments, the sorbate is a solution. The dried bead typically sorbs at least a portion of the sorbate. Exposure of the dried bead to the sorbate results in the impregnation of the polymeric bead with an active agent.

The sorbate often includes the active agent and a liquid such as a polar solvent. Sorption of the liquid often causes the polymeric bead to swell. The liquid typically facilitates the transport of the active agent into the bead. The liquid will often carry the active agent throughout the bead to form a homogenous bead. In some embodiments, however, the active agent may remain on the surface of the bead or there may be a gradient of the active agent throughout the polymeric bead with a higher concentration on the surface. For example, the size of the active agent (e.g., molecular size) as well as the polar solvent composition may affect the migration (e.g., diffusion) of the active agent into the dried bead.

The dried polymeric beads can often sorb an amount of sorbate that is equal to at least 10 weight percent, at least 20 weight percent, at least 40 weight percent, at least 50 weight percent, at least 60 weight percent, at least 80 weight percent, at least 100 weight percent, at least 120 weight percent, at least 140 weight percent, at least 160 weight percent, at least 180 weight percent, or at least 200 weight percent based on the weight of the dried polymeric beads. The weight increase is typically less than 300 weight percent, less than 275 weight percent, or less than 250 weight percent based on the weight of the dried polymeric beads.

The polymeric beads can be a carrier for an active agent, which can be present in at least a portion of the interior of the bead or on at least a portion of the surface of the bead. The active agent can be included in the precursor composition used to form the polymeric bead. Alternatively, the active agent can be sorbed by a polymeric bead that has been at least partially dried. The polymeric beads can provide diffusion-controlled transport both into and from the bulk. That is, in many embodiments, the active agent can diffuse into the polymeric bead, diffuse out of the polymeric bead, or both. The rate of diffusion should be controllable by, for example, varying the polymeric material and the crosslink density, by varying the polar solvent, by varying the solubility of the active agent in the polar solvent, and by varying the molecular weight of the active agent. The diffusion can take place over a period of several hours, several days, several weeks, or several months.

In some applications, it may be desirable that the polymeric bead containing the active agent is in a dry state. After the addition of the active agent by exposing the dried bead to the sorbate to form a second swollen polymeric bead that contains the active agent, the second swollen polymeric bead can be dried again. When this dried polymeric bead is exposed to moisture, the active agent can diffuse from the polymeric bead. The active agent can remain dormant in the bead until exposed to moisture. That is, the active agent can be stored within the dry polymeric bead until the bead is exposed to moisture. This can prevent the waste or loss of the active agent when not needed and can improve the stability of many moisture sensitive active agents that may degrade by hydrolysis, oxidation, or other mechanisms. Potential applications taking advantage of the diffusion controlled uptake or delivery of the active agent include, for example, drug delivery, wound management, and sustained-released antibacterial and antifungal protection, air freshening agents, time-released insecticides, and time-released attractants for higher animals such as fish or mammals.

As wound dressings, the polymeric beads can be loaded with various active agents that provide a therapeutic function. Wound dressings containing these active agents may reduce or eliminate infection of the wound. In addition, these wound dressings can speed the rate of wound healing when therapeutic active agents such as anti-inflammatory drugs, growth factors, alpha-hydroxyacids, enzyme inhibitors such as matrix metalloproteinase (MMP) inhibitors, enzyme activators, vasodilators, chemotactic agents, hemostatic agents (e.g., thrombin), antimicrobial agents, antihistamines, antitoxins, anesthetics, analgesics, vitamins, nutrients, or combinations are added to the polymeric beads. When used in wound dressings, the polymeric beads are typically dry prior to use in highly exuding wounds but may be used swollen to add moisture to dry wounds.

In some embodiments, the swollen polymeric beads can be used to deliver antimicrobial agents to either mammalian tissue or another environment outside the polymeric beads. Some exemplary antimicrobial agents that can be added to the polymeric beads include iodine and its various complexed forms, which are commonly referred to as iodophors. Iodophors are complexes of elemental iodine or triiodide with certain carriers. These iodophors function by not only increasing the iodine solubility but by reducing the level of free molecular iodine in solution and by providing a type of sustained release reservoir of iodine. Iodophors can be formed using polymeric carriers such as polyvinylpyrrolidone (PVP); copolymers of N-vinyl lactams with other unsaturated monomers such as, but not limited to, acrylates and acrylamides; various polyether glycols (PEGs) including polyether-containing surfactants such as nonylphenolethoxylates and the like; polyvinyl alcohols; polycarboxylic acids such as polyacrylic acid; polyacrylamides; and polysaccharides such as dextrose. Other suitable iodophors include the protonated amine oxide surfactant-triiodide complexes described in U.S. Pat. No. 4,597,975 (Woodward et al.). In some applications, the iodophor is povidone-iodine. This can be obtained commercially as povidone-iodine USP, which is a complex of K30 polyvinylpyrrolidone and iodide wherein the available iodine is present at about 9 weight percent to about 12 weight percent.

In some embodiments, various combinations of antimicrobial agents can be used in the precursor composition or sorbate. Any other known antimicrobial agents that are compatible with the precursor compositions or the resulting hydrogels can be used. These include, but are not limited to, chlorhexidine salts such as chlorhexidine gluconate (CHG), parachlorometaxylenol (PCMX), triclosan, hexachlorophene, fatty acid monoesters and monoethers of glycerin and propylene glycol such as glycerol monolaurate, glycerol monocaprylate, glycerol monocaprate, propylene glycol monolaurate, propylene glycol monocaprylate, propylene glycol moncaprate, phenols, surfactants and polymers that include a (C12-C22) hydrophobe and a quaternary ammonium group or a protonated tertiary amino group, quaternary amino-containing compounds such as quaternary silanes and polyquaternary amines such as polyhexamethylene biguamide, silver containing compounds such as silver metal, silver salts such as silver chloride, silver oxide and silver sulfadiazine, methyl parabens, ethyl parabens, propyl parabens, butyl parabens, octenidene, 2-bromo-2-nitropropane-1,3 diol, or mixtures thereof. Other antimicrobial agents are described, for example, in U.S. Patent Application Publications 2006/0052452 (Scholz), 2006/0051385 (Scholz), and 2006/0051384 (Scholz), all incorporated herein by reference.

Additionally, the polymeric beads can be used to concentrate various materials such as contaminants or toxins. For example, the polymeric beads can be used to remove contaminants from water systems or ecosystems. By incorporation of various functionalities into the polymeric material such as chelating agents, it may be possible to remove heavy metals, radioactive contaminants, and the like.

The beads often contain unreacted ethylenically unsaturated groups. These ethylenically unsaturated groups can be reacted with other monomers, such as monomers in a coating composition. The beads can be polymerized into the final coating. Further, some polymeric beads have other functional groups that can be further reacted. For example, some of the poly(alkylene oxide (meth)acrylates) included in the precursor composition have hydroxy groups that can undergo various nucleophilic substitution reactions or condensation reactions.

Exemplary cosmetic and personal care applications, for which the bead compositions may be used include, but are not limited to, wound care products such as absorbent wound dressings and wound packing to absorb excess exudates; first aid dressings, hot/cold packs, baby products, such as baby shampoos, lotions, powders and creams; bath preparations, such as bath oils, tablets and salts, bubble baths, bath fragrances and bath capsules; eye makeup preparations, such as eyebrow pencils, eyeliners, eye shadows, eye lotions, eye makeup removers and mascaras; fragrance preparations, such as colognes and toilet waters, powders and sachets; noncoloring hair preparations, such as hair conditioners, hair spray, hair straighteners, permanent waves, rinses, shampoos, tonics, dressings and other grooming aids; color cosmetics; hair coloring preparations such as hair dyes, hair tints, hair shampoos, hair color sprays, hair lighteners and hair bleaches; makeup preparations such as face powders, foundations, leg and body paints, lipsticks, makeup bases, rouges and makeup fixatives; manicuring preparations such as basecoats and undercoats, cuticle softeners, nail creams and lotions, nail extenders, nail polishes and enamels, and nail polish and enamel removers; oral hygiene products such as dentifrices and mouthwashes; personal cleanliness products, such as bath soaps and detergents, deodorants, douches and feminine hygiene products; shaving preparations such as aftershave lotions, beard softeners, men's talcum powders, shaving creams, shaving soap and pre-shave lotions; skin care preparations such as cleansing preparations, skin antiseptics, depilatories, face and neck cleansers, body and hand cleansers, foot powders and sprays, moisturizers, night preparations, paste masks, and skin fresheners; and suntan preparations such as suntan creams, gels and lotions, and indoor tanning preparations.

In some applications, the polymeric bead contains an indicator that can detect the presence or absence of another compound of interest. The indicator can be added to the dried polymeric beads using a sorbate that contains the indicator and an optional fluid such as a polar solvent (e.g., water, dimethylformamide, or the like). The beads can be contacted with samples that potentially contain the compound to be detected. The indicator can then change color if the sample contains the compound to be detected. If the indicator does not migrate out of the bead when exposed to the sample, the bead may change color. If the indicator migrates out of the bead when exposed to the sample, the sample itself may change color.

In a specific example, the polymeric beads can be loaded with an indicator such as ninhydrin that is capable of detecting the presence of amino-containing materials. The dried polymeric beads, which often are clear and colorless, can be loaded with ninhydrin to form a polymeric bead that has a yellow color. A sorbate that contains the ninhydrin as well as a polar solvent can be used to add the active agent to the polymeric bead. Upon contact of the ninhydrin-containing polymeric bead with an amino-containing material, the ninhydrin changes from a yellow to vivid purple color. Depending on the relative rates of diffusion of the ninhydrin and the amino-containing materials, the bead can change color from yellow to purple or the ninhydrin can migrate out of the bead and alter the color of an amino-containing sample. For example, small amino-containing materials can diffuse into the ninhydrin-containing polymeric beads and change the color of the beads from yellow to purple. However, relatively large proteins cannot diffuse into the polymeric beads as easily as the ninhydrin can migrate out of the beads. The color of the sample containing the protein can change to a purple color while the beads may not change to a purple color. In some other examples that contain a mixture of amino-containing materials, both the polymeric beads and the amino-containing sample may change to a purple color.

Polymeric beads loaded with dyes can be used as saturation indicators. The dye-containing polymeric beads can be dried. When the dried beads are contacted with water, the dye can diffuse out of the polymeric bead and alter the color of the water. Alternatively, dyes can be incorporated that are colorless in the absence of water but turn colored when water is sorbed into the bead. For example, certain pH indicators such as phenothalein, are colorless when dry but will turn colored when wet.

The foregoing describes the invention in terms of embodiments foreseen by the inventors for which an enabling description was available, notwithstanding that insubstantial modifications of the invention, not presently foreseen, may nonetheless represent equivalents thereto.

EXAMPLES

The invention is further described in the following illustrative examples, in which all parts and percentages are by weight unless otherwise indicated.

All organisms used in making test cultures were obtained from American Type Culture Collection, Manassas, Va.
Zone of Inhibition Assay Method

*Candida albicans* testing: *Candida albicans* (ATCC 90028) was grown overnight in DIFCO Sabouraud dextrose (SD) broth available from Voigt Global Distribution, Inc. (Lawrence, Kans.). Cells were diluted to a concentration of approximately $1\times10^6$ colony forming units (CFU) per milliliter (mL) in Phosphate Buffered Saline (PBS) from EMD Biosciences (Darmstadt, Germany) using a 0.5 McFarland Equivalence Turbidity Standard. A fungal lawn was prepared by dipping a sterile cotton applicator into the cell suspension and swabbing the dry surface of a DIFCO SD agar plate in three different directions. The agar medium was obtained from Voigt Global Distribution, Inc. Three beads from each bead sample were placed onto an inoculated plate and pressed firmly against the agar with sterile forceps to ensure complete contact with the agar. The plates were incubated at 28° C.±1° C. for 24 hours. The area under and surrounding the beads was examined for fungal growth and the diameter of the zone of inhibition was recorded.

*Aspergillus niger* testing: A suspension of $1\times10^5$ spores of *Aspergillus niger* (ATCC 16404) in PBS was applied to a DIFCO potato dextrose agar (PDA) plate using a sterile spreader. The agar plate was obtained from Voigt Global Distribution, Inc. One bead from each bead sample was placed onto an inoculated plate and pressed firmly against the agar with sterile forceps to ensure complete contact with the agar. The plates were incubated at 28° C.±1° C. for 7 days. The area under and surrounding the beads was then examined for fungal growth and the diameter of the zone of inhibition was recorded.

*Staphylococcus aureus* (ATCC 6538), gram positive testing: An inoculum suspension was prepared that contained a concentration of approximately $1\times10^8$ colony forming units (CFU) per milliliter (mL) in PBS using a 0.5 McFarland Equivalence Turbidity Standard. A bacterial lawn was prepared by dipping a sterile cotton applicator into the suspension and swabbing the dry surface of a Mueller Hinton II plate in three different directions. The plate was obtained from Teknova (Hollister, Calif.). Three beads from each bead sample were placed onto an inoculated plate and pressed firmly against the agar with sterile forceps to ensure complete contact with the agar. The plates are incubated at 28° C.±1° C. for 24 hours. The area under and surrounding the beads was examined for bacterial growth and the diameter of the zone of inhibition was recorded.

*Pseudomonas aeruginosa* (ATCC 9027), gram negative testing: An inoculum suspension was prepared that contained a concentration of approximately $1\times10^8$ colony forming units (CFU) per milliliter (mL) in PBS using a 0.5 McFarland Equivalence Turbidity Standard. A bacterial lawn was prepared by dipping a sterile cotton applicator into the suspension and swabbing the dry surface of a Mueller Hinton II plate in three different directions. The plate was obtained from Teknova (Hollister, Calif.). Three beads from each bead sample were placed onto an inoculated plate and pressed firmly against the agar with sterile forceps to ensure complete contact with the agar. The plates are incubated at 28° C.±1° C. for 24 hours. The area under and surrounding the beads was examined for bacterial growth and the diameter of the zone of inhibition was recorded.

Liquid Broth Testing of Fungal Growth Inhibition

For each antifungal agent tested, duplicate flasks containing 50 mL of DIFCO malt extract broth were inoculated with approximately $10^5$ spores of Aspergillus niger (ATCC 16404). Ten beads were added to each flask, and samples were incubated at 28° C.±1° C. for 7 days in the dark on a shaker (until visible growth was observed in the control flask). On day 7, sample flasks were photographed. Fungal biomass, recovered by filtering the flask contents, was weighed both immediately after collection and after drying for 4 hours.

ASTM E 2149-01: Standard Test Method for Determining the Antimicrobial Activity of Immobilized Antimicrobial Agents under Dynamic Contact Conditions This method involved inoculation of a buffer solution with an overnight culture of bacterial cells. The buffer solution was 0.3 mM $KH_2PO_4$ from EM Science (Gibbstown, N.J.). The bacterial cells were either Pseudomonas aeruginosa (ATCC 9027) or Staphylococcus aureus (ATCC 6538). Final concentration of the bacteria in the buffer was $1\times10^6$ CFUs/mL. Ten hydrogel beads from each sample were tested per 50 mL of buffer. Samples were incubated with constant agitation for 24 hours at 28° C.±1° C. After 24 hours, surviving microorganisms were plated and counted using 3M PETRIFILM Aerobic Count (AC) Plates, which are available from 3M (Saint Paul, Minn.). The 3M PETRIFILM AC plates were incubated for 48 hours at 35° C.±1° C. Calculations of percent reduction of bacteria from treated versus untreated samples were made.

Example 1

Basic Bead-Forming Process

Beads were made on equipment as illustrated in FIG. 2. Reference is made to the various elements of FIG. 2, the reference numerals are indicated within parenthesis. A homogeneous precursor composition (50) was prepared by mixing 40 grams of 20-mole ethoxylated trimethylolpropane triacrylate (TMPTA) (SR415 from Sartomer, Exeter, Pa.), 60 grams deionized (DI) water, and 0.8 grams photoinitiator (IRGACURE 2959 from Ciba Specialty Chemicals, Tarrytown, N.Y.). The average functionality of the ethoxylated TMPTA used in this example and all subsequent examples was determined from HPLC data showing that the monomer was 53.6 weight percent trifunctional acrylate (52.5 mole percent), 45.3 weight percent difunctional acrylate (46.5 mole percent), and 1.0 weight percent monofunctional acrylate (1.1 mole percent). Using this information and assuming an average of 20-mole ethoxylation for each species, the average functionality was calculated to be about 2.5. The precursor composition (50) was poured into a funnel (32) such that the precursor composition (50) exited the funnel (32) through a 2.0 millimeter diameter orifice (34). Precursor composition (50) fell along the vertical axis of a 0.91 meter long, 51 millimeter diameter quartz tube (46) that extended through a UV exposure zone defined by a light shield (44) and a 240 W/inch irradiator (available from Fusion UV Systems, Gaithersburg, Md.) equipped with a 25-cm long "H" bulb (42) coupled to an integrated back reflector (44) such that the bulb orientation was parallel to falling precursor composition (50). Below the irradiator (40), polymeric beads (10) were obtained. The entire process was operated under ambient conditions.

Figure 4:
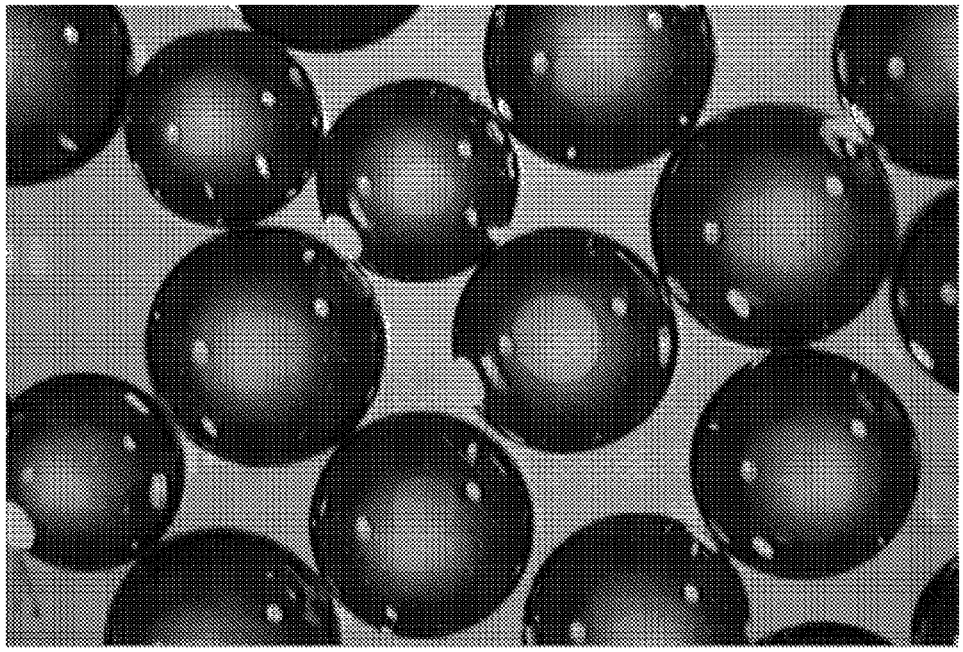
FIG. 4 is an optical micrograph of a plurality of exemplary polymeric beads at a magnification of 50 times.

The clear, free-flowing polymeric beads (10) had a glossy appearance with no visible sign of porosity. The beads ranged in diameter from approximately 1 millimeter to 4 millimeters. Beads (10) were collected in a plastic bag attached to the base of quartz tube (46). The yield was essentially quantitative. The beads were elastic but could be crushed and were found to have a homogeneous composition throughout their makeup. An optical micrograph of typical beads is shown in FIG. 4.

Example 2

Polymeric Beads Comprising a Blend of Acrylates

The process of Example 1 was repeated using a precursor composition of 5 grams SR415, 5 grams tetrahydrofurfuryl acrylate (SR285 from Sartomer), 0.2 grams IRGACURE 2959, and 30 g deionized (DI) water. The calculated average functionality of the monomers was 1.2. The beads that formed were comparable in appearance and size to those of Example 1.

Example 3

Impregnating Polymeric Beads with a Water Soluble Solute

A sample (5 grams) of beads prepared as described in Example 1 were placed in a vial and dried in an oven at 100° C. for 2 hours. When dry, the resulting weight loss was 60 weight percent, which corresponded to quantitative loss of the water present in the original beads. The dried beads appeared as deflated spheres but showed no sign of porosity.

The dried beads were covered with an aqueous solution of methyl red. Within an hour, the majority of the solution had been absorbed by the polymeric beads. The red-colored beads were then filtered and rinsed with DI water.

Example 4

Preparation of Polymer Beads Having a Smaller Average Diameter

The process of Example 1 was repeated, except that the precursor composition exited the funnel through a micropipette tip having an inner diameter of 0.75 millimeter. The height of liquid in the funnel was maintained at a constant level in order to maintain a steady flow of precursor composition through the exit orifice. The average bead diameter was about 700 micrometers.

Example 5

Conductive Beads

Figure 7:
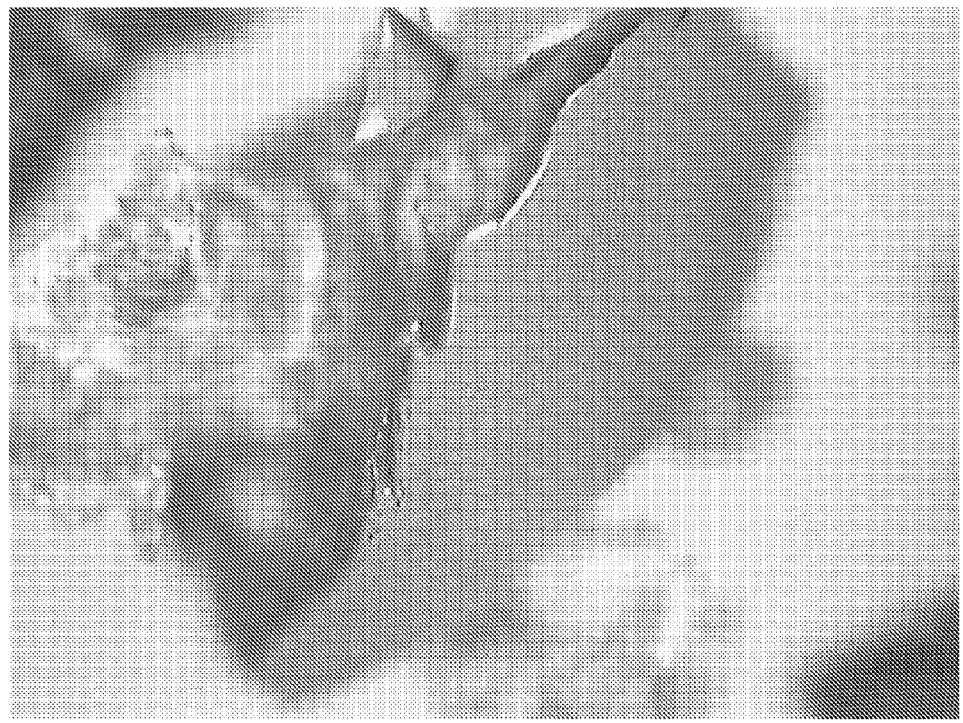
FIG. 7 is an optical micrograph (magnification 100 times) of an exemplary bead that has been crushed to show a silver coating on the surface.

The process of Example 1 was repeated using a precursor composition containing a 5 weight percent (+)-glucose solution in DI water. Glucose is a known reducing sugar. The resulting beads were rinsed with fresh DI water and then a small number of beads (i.e., a covered spatula) were placed into a 10 weight percent solution of silver nitrate in water. Both the silver nitrate and (+)-glucose are available from Sigma-Aldrich Chemical Co. (Saint Louis, Mo.). The surface of the beads darkened as silver ions were reduced to silver metal on the surface of the beads. A measure of electrical resistance showed that the beads were much more conductive than the beads prior to the silver treatment. Upon crushing a bead, it was seen that the silver was localized near the surface (by appearance of the darker color) and had not penetrated into the bulk interior region; see FIG. 7. Note that this micrograph also shows the non-porous nature of the interior portion of the polymeric bead.

Example 6

Preparation of a Bead with Physiological Activity

Beads were made following the process of Example 1 in which the DI water was replaced with a 3 weight percent $H_2O_2$ solution. While no testing was done on the resulting beads, the beads were expected to show physiological activity.

Example 7

Migration of a Species from Polymeric Beads

A spatula tip of red-colored beads from Example 3 was placed in a vial containing several grams of DI water. Within a few minutes, there was evidence of red coloration diffusing into the bulk water phase.

Example 8

Use of an Ultrasonic Atomization Nozzle

Figure 3:
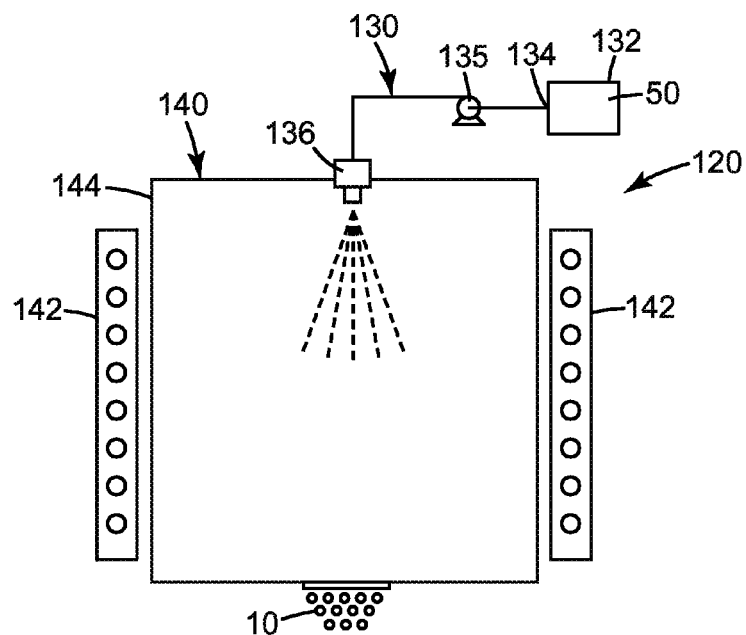
FIG. 3 is a schematic diagram of a second embodiment of a process and equipment for making the polymeric beads.
Figure 5:
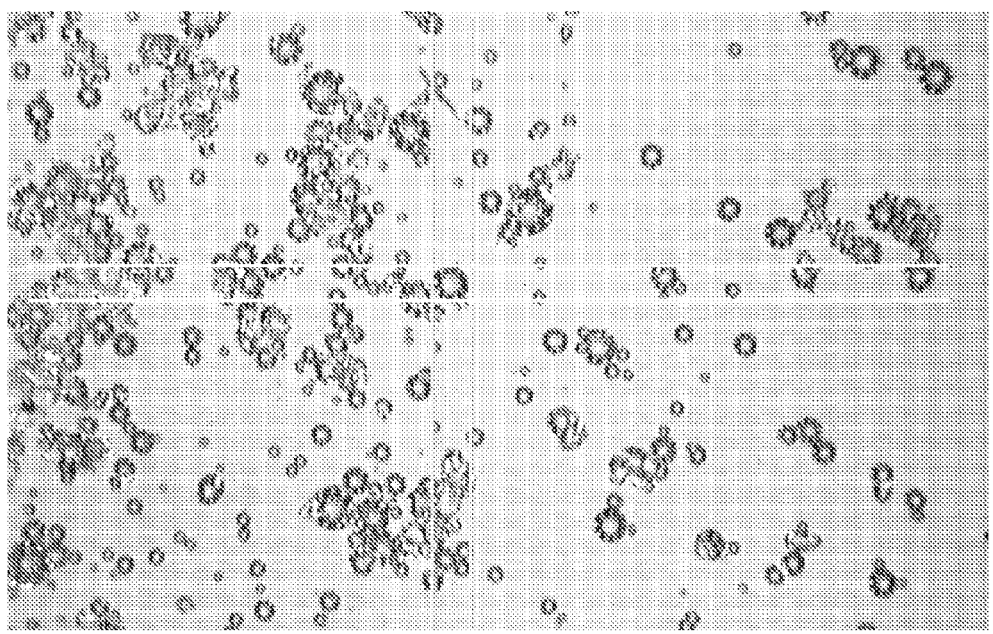
FIG. 5 is an optical micrograph of a plurality of other exemplary polymeric beads at a magnification of 200 times.

This example was prepared according to the schematic shown in FIG. 3. An atomization nozzle operating at 120 kHz (Sono-Tek Corp., Milton, N.Y.) was used to generate a spray of a 40 weight percent SR415 in water solution containing 1 wt-weight percent IRGACURE 2959. The average functionality of the monomers was 2.5. The precursor composition was sprayed into a 76 millimeter diameter quartz tube where it was exposed to the output of an HP-6 irradiator from Fusion UV Systems (Gaithersburg, Md.) with a 15-cm long "H" bulb. The beads that formed were collected as a fine powder on the walls of a plastic bag located at the exit end of the quartz tube. The beads produced had a maximum diameter of about 0.05 millimeters. The resulting polymeric beads are shown in FIG. 5, which is a field emission scanning micrograph of a plurality of exemplary polymeric beads at a magnification of 50,000 times.

Example 9

Preparation of a Polymeric Bead with High Refractive Index

Example 1 was repeated except the DI water was replaced by a 44.5 weight percent yttrium-stabilized zirconia sol. The resulting beads had a translucent appearance and contained 27 weight percent $ZrO_2$ that was doped with yttrium. The sol was prepared using the hydrothermal method described in Example 6 of U.S. Patent Application Publication No. 2006/0148950 A1 (Davidson et al.).

Example 10

Making and Drying the Beads

Beads were prepared as described in Example 1 (large beads) and 8 (small beads). The beads were then dried for 1.5 hours at 70° C. The dried beads were used in Examples 11 to 17 as described below. For Examples 11-13, both large and small beads were tested. For Examples 14-17, large beads were tested.

Example 11

Absorption of Iodine from a Povidone Iodine Solution into the Beads

A povidone iodine solution was prepared by combining 10 parts by weight povidone iodine with 90 parts by weight water. Povidone iodine, which is a 1-ethenyl-2-pyrrolidone homopolymer compound with iodine, can be used as an antiseptic. Povidone iodine is available from Prudue Frederick Company (Stamford, Conn.) under the trade designation BETADINE and is also available from Sigma-Aldrich Co. (Saint Louis, Mo.). One part by weight of the dried beads from Example 10 was placed in a glass jar along with two parts by weight of the povidone iodine solution. The beads were allowed to absorb the solution for 2 hours at room temperature, turning red in color. Afterwards, the beads were removed from solution, rinsed with DI water, and air dried. Samples were then transferred to a clean glass vial and capped. These beads were then evaluated against *Candida albicans* using the zone of inhibition method. The diameter of the zone of inhibition ranged from 6 mm for a small bead to 16 mm for a large bead.

Example 12

Absorption of Miconazole into the Beads

A saturated solution of miconazole was prepared by adding approximately 1 part by weight miconazole nitrate to 99 parts water. The miconazole nitrate, which is 1-[2-(2,4-dichlorophenyl)-2-[(2,4-dichlorophenyl)methoxy]ethyl]imidazole, can be used as an antifungal agent and can be obtained from Sigma-Aldrich Chemical Co., Saint Louis, Mo. After 3 days of gentle rocking, excess undissolved miconazole was removed by centrifuging the solution for 15 minutes at 2900 times the force of gravity. The supernatant was then passed through a 0.22 micron syringe filter, which is commercially available from Whatman (Middlesex, UK). One part by weight of the dried beads from Example 10 was placed in a glass jar along with two parts by weight of miconazole solution. The beads were allowed to absorb the solution for 2 hours at room temperature. Afterwards, the beads were removed from solution, rinsed with DI water, and air dried. Samples were then transferred to a clean glass vial and capped. The beads treated with miconazole were evaluated against *Candida albicans* using the zone of inhibition assay method. The diameter of the zone of inhibition ranged from 9 mm for small beads to 13 mm for large beads.

Example 13

Absorption of Econazole into the Beads

A saturated solution of econazole was prepared by adding approximately 1 part by weight econazole to 99 parts by weight water. Econazole, which is 1-[2-[(4-chlorophenyl) methoxy]-2-(2,4-dichlorophenyl)-ethyl]imidazole, can be used as an antifungal agent and is commercially available from Sigma-Aldrich Chemical Co. (Saint Louis, Mo.). After 3 days of gentle rocking, excess undissolved econazole was removed by centrifuging the solution for 15 minutes at 2900 times the force of gravity. The supernatant was then passed through a 0.22 micron syringe filter. One part by weight of the dried beads from Example 10 was placed in a glass jar along with two parts by weight of econazole solution. The beads were allowed to absorb the solution for 2 hours at room temperature. Afterwards, the beads were removed from solution, rinsed with DI water, and air dried. Samples were then transferred to a clean glass vial and capped. The beads treated with econazole were evaluated against *Candida albicans* using the zone of inhibition assay method. The diameter of the zone of inhibition ranged from 7 mm for small beads to 16 mm for large beads.

Example 14

Absorption of ZINC OMADINE into the beads

ZINC OMADINE solution was prepared by combining 5 parts by weight ZINC OMADINE and 95 parts by weight water. ZINC OMADINE is a trade designation for a zinc complex of pyrithione that is commercially available from Arch Biocides (Cheshire, Conn.). This material is a broad spectrum antimicrobial agent typically used as a fungicide-algaecide. The powder is 97 weight percent active zinc pyrithione. One part by weight of the large dried beads from Example 10 was placed in a glass jar along with 2 parts by weight of ZINC OMADINE mixture. The beads were allowed to absorb the solution for 2 hours at room temperature while on a wrist action shaker to prevent the ZINC OMADINE from settling. Afterwards, the beads were removed from solution, rinsed with DI water, and air dried. The resulting beads turned white indicating the presence of ZINC OMADINE powder inside the beads. Samples were then transferred to a clean glass vial and capped. The beads treated with ZINC OMADINE were evaluated using the zone of inhibition and liquid broth growth inhibition tests. The diameter of the zone of inhibition against *Candida albicans* and against *Aspergillus niger* were respectively 22 mm and 35 mm. For the liquid broth growth inhibition test against *Aspergillus niger*, the weight after filtering was 1.05 grams and the weight after both filtering and drying was 0.95 grams. This compares to filter paper having a weight after filtering of 0.91 grams and a weight after both filtering and drying of 0.76 grams. The growth control had a weight of 2.91 grams after filtering and a weight of 2.80 grams after both filtering and drying.

Example 15

Absorption of OMACIDE IPBC into the Beads

Two solutions containing OMACIDE IPBC (available from Arch Chemicals, Cheshire, Conn.) were prepared. OMACIDE is a trade designation of Arch Chemicals and IPBC is a fungicide based on iodopropyl butyl carbamate. The first solution was one part by weight OMACIDE IPBC100 (containing 97 weight percent active IPBC) combined with 20 parts by weight isopropanol. The second solution was one part by weight OMACIDE IPBC40 (containing 40 weight percent active IPBC in solution) combined with 16 parts by weight isopropanol. One part by weight of the large dried beads from Example 10 was placed in a glass jar along with 2 parts by weight of each OMACIDE solution. The beads were allowed to absorb the solution for 2 hours at room temperature. Afterwards, the beads were removed from solution, rinsed with DI water, and air dried. Samples were then transferred to a clean glass vial and capped. The beads treated with each OMACIDE were evaluated using the zone of inhibition and liquid broth growth inhibition tests. The diameters of the zone of inhibition against *Candida albicans* for OMACIDE IPBC100 and OMACIDE IPBC40 were 26 mm and 22 mm, respectively. The zone of inhibition against *Aspergillus niger* could not be measured because the no growth zone covered the entire agar plate. For the liquid broth growth inhibition test of *Aspergillus niger* against the beads treated with OMACIDE IPBC40, the weight after filtering was 0.88 grams and the weight after both filtering and drying was 0.69 grams. This compares to filter paper having a weight after filtering of 0.91 grams and a weight after both filtering and drying of 0.76 grams. The growth control had a weight of 2.91 grams after filtering and a weight of 2.80 grams after both filtering and drying.

Example 16

Absorption of Triclosan into the Beads

A Triclosan solution was prepared by combining 0.5 parts by weight Triclosan with 10 parts by weight IPA. Ticlosan has the chemical formula 2,4,4'-trichloro-2'-hydroxy diphenyl ether, and is commercially available from Ciba Specialty Chemicals (Tarrytown, N.Y.). The solution was agitated until the Triclosan was completely dissolved. One part by weight of the large dried beads from Example 10 was placed in a glass jar along with 3 parts by weight of Triclosan solution. The beads were allowed to absorb the solution for 2 hours at room temperature. After that, the beads were filtered out of solution, rinsed with DI water, briefly dried on a paper towel, then transferred to a clean glass vial and capped. The beads treated with Triclosan were evaluated using the zone of inhibition and liquid broth growth inhibition tests. The diameter of the zone of inhibition against *Candida albicans* was 3 mm. There was no zone of inhibition against *Aspergillus niger*. For the liquid broth growth inhibition test against *Aspergillus niger*, the weight after filtering was 1.40 grams and the weight after both filtering and drying was 1.30 grams. This compares to the filter paper having a weight after filtering of 0.91 grams and a weight after both filtering and drying of 0.76 grams. The growth control had a weight of 2.91 grams after filtering and a weight of 2.80 grams after both filtering and drying.

Example 17

Absorption of Sorbic Acid into the Beads

One part by weight sorbic acid was combined with 9 parts by weight IPA and mixed to dissolve. The sorbic acid is commercially available from Sigma-Aldrich Co, (St. Louis, Mo.) and is often used as a food preservative to inhibit growth of molds, yeasts and fungi. The sorbic acid dissolved in the IPA after 1 hour of mixing with a magnetic stirring bar. Two parts by weight of the sorbic acid solution was combined with 1 part by weight large dried beads from Example 10 and allowed to absorb for 2 hours. The beads were strained and rinsed with distilled water. The final weight of the beads increased by 58 weight percent. The beads were placed in a glass vial and capped. The beads were evaluated using the zone of inhibition and liquid broth growth inhibition tests. There was no zone of inhibition against *Candida albicans*. The diameter of the zone of inhibition against *Aspergillus niger* was 7 mm. For the liquid broth growth inhibition test against *Aspergillus niger*, the weight after filtering was 3.11 grams and the weight after both filtering and drying was 2.80 grams. This compares to filter paper having a weight after filtering of 0.91 grams and a weight after both filtering and drying of 0.76 grams. The growth control had a weight of 2.91 grams after filtering and a weight of 2.80 grams after both filtering and drying.

Example 18

Prolonged Release of Miconazole and Econazole from Beads

Beads from Examples 12 and 13 above were examined for time-dependent active release. After the zone of inhibition was measured for the beads, the same beads were transferred to a freshly inoculated agar plates and incubated for 24 hours. At that time, the zone of inhibition was measured again as the day 2 zone and the beads were transferred again to a new plate. This process was repeated on a daily basis for one week or until no zone was detected. For small beads that were treated with econazole (Example 13 above), the zone of inhibition dropped from 7 mm on day 1 to zero on day 5. For large beads, that were treated with econazole (Example 13 above), the zone of inhibition dropped from 16 mm on day 1 to 12 mm on day 7. For small beads treated with miconazole (Example 12 above), the zone of inhibition dropped from 9 mm on day 1 to zero on day 5. For large beads treated with miconazole (Example 12 above), the zone of inhibition dropped from 13 mm on day 1 to 11 on day 7.

Example 19

Making and Drying the Beads

Polymer beads were prepared as described in Example 1. The beads were dried at 60° C. for 2 hours. After drying, the beads appeared smaller in size and had a weight loss of about 60 percent of their original weight, which corresponded to the amount of polar solvent originally present in the beads. The dry beads were used in various Examples described below.

Example 20

Absorption Over Time

Ten dried beads from Example 19 were weighed and then submerged into DI water for various specific periods of time. The beads were removed from the water after the designated time period had passed and weighed to determine the amount of water absorbed into the beads during that time period. The percent weight gain was about 175 percent in 30 minutes and about 190 percent in 120 minutes. The procedure was repeated with isopropanol in place of the DI water. The percent weight gain was about 20 percent in 30 minutes and about 25 percent in 120 minutes. The weight gain is based on the weight of the dried beads.

Example 21

Absorption of Silver Oxide into the Beads

A silver oxide-containing solution was prepared by combining 5 parts by weight ammonium carbonate, commercially available from Sigma-Aldrich Chemical Company (St. Louis, Mo.), with 95 parts by weight water and mixing until the salt was dissolved. One part by weight silver oxide (AgO), commercially available from Alfa Aesar (Ward Hill, Mass.), was added to this solution. The mixture was stirred at 60° C. for one hour until the silver oxide was dissolved resulting in a clear transparent solution containing silver ions.

One part by weight of the dried beads from Example 19 was placed in a glass jar along with 3 parts by weight of silver oxide solution. Within one minute, the beads began to develop a gray color indicative of silver precipitation within the beads. The beads were allowed to absorb the solution for 2 hours at room temperature, turning dark gray in color. After that, the beads were filtered out of solution, rinsed with DI water, briefly dried on a paper towel, and then transferred to a clean glass vial and capped. The beads treated with silver oxide were evaluated using the zone of inhibition assay method. The diameter of the zone of inhibition against *Staphylococcus aureus* was 9 mm and the diameter of the zone of inhibition against *Pseudomonas aeruginosa* was 8 mm.

Example 22

Absorption of Bronopol (2-bromo-2-nitropropane-1,3-diol) into the Beads

A Bronopol solution was prepared by combining 1 part by weight Bronopol (Trade designation MYACIDE AS PLUS), commercially available from BASF (Germany), with 5 parts by weight IPA. Bronopol can function as an antimicrobial agent. The solution was agitated until well dissolved. One part by weight of the dried beads from Example 19 was placed in a glass jar along with 3 parts by weight of Bronopol solution. The beads were allowed to absorb the solution for 2 hours at room temperature. After that, the beads were filtered out of solution, rinsed with DI water, briefly dried on a paper towel, and then transferred to a clean glass vial and capped. The beads were evaluated using the zone of inhibition assay method. The diameter of the zone of inhibition against *Staphylococcus aureus* was 34 mm and the diameter of the zone of inhibition against *Pseudomonas aeruginosa* was 36 mm.

Example 23

Absorption of Quaternary Amine Biocides into the Beads

Two solutions of quaternary amine biocides (e.g., agricultural pesticide) were prepared by combining 1 part by weight BARDAC 208M or BARDAC 205M, which are both commercially available from Lonza Group, Ltd. (Valais, Switzerland), with 2 parts by weight IPA. BARDAC 208M and 205M are blends of twin chain quaternary ammonium compounds and alkyl dimethyl benzyl ammonium chloride, with BARDAC 208M having 50% more actives than BARDAC 205M. The solutions were agitated until well dissolved. One part by weight of the dried beads from Example 19 was placed in a glass jar along with 3 parts by weight of each solution. The beads were allowed to absorb the solution for 2 hours at room temperature. After that, the beads were filtered out of solution, rinsed with DI water, briefly dried on a paper towel, and then transferred to a clean glass vial and capped. The treated beads were evaluated using the zone of inhibition assay method. The diameter of the zone of inhibition against *Staphylococcus aureus* was 21 mm for BARDAC 208M and 19 mm for BARDAC 205M. There was no zone of inhibition against *Pseudomonas aeruginosa* for BARDAC 208M while the diameter of the zone of inhibition was 3 mm for BARDAC 205M.

Example 24

Absorption of PHMB (polyhexamethylene biguamide) into the Beads

One part by weight of the dried beads from Example 19 was placed in a glass jar along with 3 parts by weight of either COSMOCIL CQ or VANTOCIL P. Both COSMOCIL CQ and VANTOCIL P are commercially available from Arch Chemicals, Inc. (Norwalk, Conn.). These materials are chemically similar antibacterial agents except COSMOCIL holds FDA approval and is typically used for human skin applications, while VANTOCIL has EPA registration and is typically used for industrial applications. The beads were allowed to absorb the solution for 2 hours at room temperature. After that, the beads were filtered out of solution, rinsed with DI water, briefly dried on a paper towel, and then transferred to a clean glass vial and capped. The treated beads were evaluated using the zone of inhibition assay method. The diameter of the zone of inhibition against *Staphylococcus aureus* was 16 mm for COSMOCIL CQ and 18 mm for VANTOCIL P. The diameter of the zone of inhibition against *Pseudomonas aeruginosa* was 8 mm for both COSMOCIL CQ and VANTOCIL P.

Example 25

Absorption of Triclosan into the Beads

A Triclosan solution was prepared by combining 0.5 parts by weight Triclosan with 10 parts by weight IPA. Triclosan, which is available from Ciba Specialty Chemicals (Tarrytown, N.Y.), is 5-chloro-2-(2,4-dichlorophenoxy)phenol and is used as a antibacterial agent and a antifungal agent. The solution was agitated until the Triclosan was completely dissolved. One part by weight of the dried beads from Example 19 was placed in a glass jar along with 3 parts by weight of Triclosan solution. The beads were allowed to absorb the solution for 2 hours at room temperature. After that, the beads were filtered out of solution, rinsed with DI water, briefly dried on a paper towel, and then transferred to a clean glass vial and capped. The treated beads were evaluated using the zone of inhibition assay method. The diameter of the zone of inhibition against *Staphylococcus aureus* was 27 mm and there was no zone of inhibition against *Pseudomonas aeruginosa*.

Example 26

Adsorption of Au into the Beads

Gold chloride solution was prepared by dissolving 1 part by weight gold chloride in 99 parts by weight DI water. Gold chloride can be obtained from Sigma-Aldrich (Saint Louis, Mo.). The gold chloride powder dissolved quickly in the water resulting in a clear, transparent solution. One gram of this solution was added to 0.5 grams dried beads from Example 19. After 15 minutes, the beads turned yellow in color while the surrounding solution remained clear and transparent. This indicates that gold was reduced within the beads. After two hours, most of the solution was absorbed, and the beads were filtered out of the solution, rinsed with DI water, dried briefly on paper towel and weighed. The total weight of the beads was 1.28 grams indicating a total weight increase of 156 weight percent. The beads can effectively absorb and concentrate metal ions from solution.

Example 27

Prolonged Release of Bromopol, Bardac 205M, and Vantocil P

Beads from Examples 22, 23, and 24 above were examined for time dependent active diffusion. After the zone of inhibition was measured, the same beads were transferred to a freshly inoculated agar plates and incubated for 24 hours. At that time, the zone of inhibition was measured again as the day 2 zone, and the beads were transferred again to a new plate. This process was repeated on a daily basis until no zone was detected. The zone of inhibition against *Staphylococcus aureus* dropped from 38 mm to zero in 5 days and the zone of inhibition against *Pseudomonas aeruginosa* dropped from 40 mm to zero in 5 days for beads treated with Bromopol. The zone of inhibition against *Staphylococcus aureus* dropped from 21 mm to 10 mm in about 30 days for beads treated with Barbac 205M. This zone of inhibition remained fairly constant out to about 110 days, at which point the experiment was stopped. The zone of inhibition against *Pseudomonas aeruginosa* remained at about 3 mm for 21 days, then dropped to zero at day 22 for Bardac 205M. The zone of inhibition against *Staphylococcus aureus* dropped from 19 mm to 6 mm in about 30 days for beads treated with Vantocil P, remained constant at 6 mm for 32 more days and then decreased to zero by 68 days. The zone of inhibition against *Pseudomonas aeruginosa* dropped from 9 mm to about 3 mm within 5 days, remained constant at about 3 mm for 21 days, and then dropped to zero at day 22 for Vantocil P.

Example 28

Adsorption of Iodine

Beads prepared as described in Example 10 were weighed into a 50 mL plastic centrifuge tube and washed three times by filling the tube almost full with water and rocking it for at least 10 minutes. Dried beads weighing 4.27 grams took up 15 mL of bed volume when swollen with water. This corresponds to a bead volume of 0.284 grams/mL or 3.51 mL/gram. A sample of 5 mL of the beads (1.42 grams) was mixed with 10 mL of 100 mM $I^{-3}$ (solution of 100 mM iodine and 200 mM KI) and then diluted to 40 mL with water. This sample was allowed to rock slowly for five hours. After that time, essentially all the iodine (purple color) was adsorbed by the beads. The calculated capacity was 0.39 grams iodine/gram bead.

A second experiment was done in which undried beads were washed three times by rocking in water (100 mL water to about 10 mL beads) for one hour and then rocking in 100 mL of methanol and then 100 mL of water. A 2 mL bed volume of these beads soaked up at least 10 mL of the iodine in the 100 mM $I^{-3}$ solution. This corresponds to 0.67 grams of iodine per gram of beads.

Example 29

Scented Beads

The dried beads from Example 19 were combined with scented apple oil by combining 1 part by weight polymeric beads with 2 parts by weight scented oil, and allowing the beads to absorb the oil for 2 hours. The oil is sold as "Applejack and Peel", Home Fragrance Oil, available from Tsumura International, Secaucus, N.J. The swollen beads were placed on a glass plate. The air around the beads smelled of apple fragrance for 2 months.

Example 30 to 34

Beads Prepared Using Cationic Monomers

Polymeric beads were prepared as described in Example 1 except that precursor composition was altered as indicated in Table 1. The various components of the precursor composition were stirred together in an amber jar until the antimicrobial monomer dissolved.

DMAEMA-$C_8$Br was formed within three-neck round bottom reaction flask that was fitted with a mechanical stirrer, temperature probe, and a condenser. The reaction flask was charged with 234 parts of dimethylaminoethylmethacrylate, 617 parts of acetone, 500 parts of 1-bromooctane, and 0.5 parts of BHT antioxidant. The mixture was stirred for 24 hours at 35° C. At this point, the reaction mixture was cooled to room temperature and a slightly yellow clear solution was obtained. The solution was transferred to a round bottom flask and acetone was removed by rotary evaporation under vacuum at 40° C. The resulting solids were washed with cold ethyl acetate and dried under vacuum at 40° C. DMAEMA-$C_{10}$Br and DMAEMA-$C_{12}$Br were formed using a similar procedure in which the 1-bromooctane was replaced by 1-bromodecane and 1-bromododecane, respectively.

The 3-(acryloamidopropyl)trimethylammonium chloride was obtained from Tokyo Kasei Kogyo Limited (Japan). Ageflex FA-1Q80MC was obtained from Ciba Specialty Company.

TABLE 1

Beads with antimicrobial monomer

| Example | Cationic monomer | Antimicrobial monomer | Propylene Glycol | SR415 | Irgacure 2959 |
|---|---|---|---|---|---|
| 30 | DMAEMA-$C_8$Br | 1.86 g | 7.44 g | 13.02 g | 0.30 g |
| 31 | DMAEMA-$C_{10}$Br | 1.91 g | 7.60 g | 13.30 g | 0.30 g |
| 32 | DMAEMA-$C_{12}$Br | 1.92 g | 7.68 g | 13.44 g | 0.31 g |
| 33 | (3-Acrylamidopropyl) trimethylammonium chloride | 2.34 g | 9.38 g | 17.50 g | 0.40 g |
| 34 | Ageflex FA-1Q80MC | 2.50 g | 10.00 g | 17.50 g | 0.40 g |

The average functionality for the monomers was 2.0 for Examples 30 and 31, 2.1 for Example 32, 1.9 for Example 33, and 1.8 for Example 34.

The resulting hydrogel beads were evaluated for antimicrobial performance using both the zone of inhibition assay method and the ASTM E2149-01 test method. The results are shown in Table 2.

TABLE 2

Antimicrobial Performance Results for Examples 32-36

| | Zone of Inhibition (mm) | | % Reduction of Microorganism Using ASTM E2149-01 | |
|---|---|---|---|---|
| Example | S. aureus | Ps. aeruginosa | S. aureus | Ps. aeruginosa |
| 30 | 10 | none | 50 | 99 |
| 31 | 18 | 4 | 55 | 100 |
| 32 | 23 | 4 | 100 | 100 |
| 33 | none | none | 0 | 99 |
| 34 | none | none | 0 | 98 |

Example 35-45

Reaction of Polymeric Beads with Cationic Monomers (Propylene Glycol Solvent)

Beads were prepared as described in Example 19. The beads were reacted with various cationic monomers. Examples 35 to 43 included the use of cationic monomers of formula

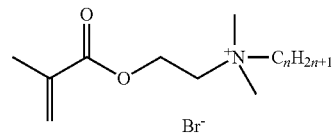

where n was equal to 4, 6, 8, 10, 12, 16, 18, or 20.

Each of these cationic monomers was prepared using a similar process. A three neck round bottom reaction flask was fitted with a mechanical stirrer, temperature probe, and a condenser. The reaction flask was charged with 234 parts by weight of dimethylaminoethyl methacrylate, 617 parts by weight of acetone, 500 parts by weight of 1-bromoalkane, and 0.5 parts by weight of BHT antioxidant. The mixture was stirred for 24 hours at 35° C. At this point the reaction mixture was cooled to room temperature and a slightly yellow clear solution was obtained. The solution was transferred to a round bottom flask and acetone was removed by rotary evaporation under vacuum at 40° C. The resulting solids were washed with cold ethyl acetate and dried under vacuum at 40° C. The 1-bromoalkanes used had 4, 6, 8, 10, 12, 16, 18, 20, or 22 carbon atoms.

Two other commercially available cationic monomers were used to prepare Examples 44 and 45. (3-Acrylamidopropyl) trimethylammonium chloride is commercially available from Tokyo Kasei Kogyo Limited (Japan) and Ageflex FA-1Q80MC is N,N-dimethylaminoethyl acrylate methyl chloride is commercially available from Ciba Specialty Chemicals (Tarrytown, N.Y.).

Each example was prepared by forming a cationic monomer solution as shown in Table 3. All of the ingredients shown in Table 3 for each example were mixed in an amber jar. The resulting mixtures were stirred until the cationic monomer (which is typically a solid powder) dissolved.

TABLE 3

Cationic monomer solutions in Propylene Glycol

| Example | Cationic monomer | Antimicrobial monomer (g) | Propylene Glycol (g) | Irgacure 2959 (g) |
|---|---|---|---|---|
| 35 | DMAEMA-$C_4$ | 1.00 | 4.00 | 0.02 |
| 36 | DMAEMA-$C_6$ | 1.00 | 4.00 | 0.02 |
| 37 | DMAEMA-$C_8$ | 1.00 | 4.00 | 0.02 |

TABLE 3-continued

Cationic monomer solutions in Propylene Glycol

| Example | Cationic monomer | Antimicrobial monomer (g) | Propylene Glycol (g) | Irgacure 2959 (g) |
|---|---|---|---|---|
| 38 | DMAEMA-$C_{10}$ | 1.00 | 4.00 | 0.02 |
| 39 | DMAEMA-$C_{12}$ | 1.00 | 4.00 | 0.02 |
| 40 | DMAEMA-$C_{16}$ | 1.00 | 4.00 | 0.02 |
| 41 | DMAEMA-$C_{18}$ | 1.00 | 4.00 | 0.02 |
| 42 | DMAEMA-$C_{20}$ | 1.00 | 4.00 | 0.02 |
| 43 | DMAEMA-$C_{22}$ | 1.00 | 4.00 | 0.02 |
| 44 | (3-Acrylamidopropyl) trimethylammonium chloride | 1.00 | 4.00 | 0.02 |
| 45 | Ageflex FA-1Q80MC | 1.00 | 4.00 | 0.02 |

The monomer solutions described in Table 3 (2 grams of each solution) were combined with 1 gram of dried beads each and allowed to contact the beads for two hours. The beads were filtered and rinsed, then weighed to determine the amount of monomer solution sorbed into the beads. The percent weight gain of the beads is shown in Table 4. The beads were placed in a shallow aluminum pan and post-cured by passing twice under a medium-pressure Hg bulb on a conveyor belt UV processor. Total UVA energy was 354 mJ/cm$^2$.

The beads treated with the cationic monomer solutions were evaluated for antimicrobial performance using both the zone of inhibition test method and ASTM E2149-01 test method. The results of antimicrobial performance are shown in Table 4. The results suggest that medium size monomers (DMAEMA-$C_{12}$ and DMAEMA-$C_{16}$) give best antimicrobial performance.

TABLE 4

Antimicrobial Performance Results

| | % increase in bead weight | Zone of Inhibition (mm) | | % Reduction of Microorganism Using ASTM E2149-01 | |
|---|---|---|---|---|---|
| Example | | S. aureus | Ps. aeruginosa | S. aureus | Ps. aeruginosa |
| 35 | 30.3 | none | none | 53 | 100 |
| 36 | 28.0 | none | none | 0 | 15 |
| 37 | 26.4 | none | none | 53 | 88 |
| 38 | 27.9 | none | none | 27 | 95 |
| 39 | 25.3 | 5.7 | none | 98 | 79 |
| 40 | 26.2 | 7.7 | none | 99.6 | 100 |
| 41 | 24.2 | none | none | 5 | 14 |
| 42 | 23.4 | none | none | 20 | 70 |
| 43 | 24.2 | none | none | 18 | 0 |
| 44 | 25.3 | none | none | 100 | 87 |
| 45 | 19.8 | none | none | 95 | 98 |

Example 46-53

Reaction of Polymeric Beads with Cationic Monomers (Isopropyl Alcohol Solvent)

Beads were prepared as described in Example 19. The beads were reacted with various cationic monomers. All of the ingredients shown in Table 5 for each example were mixed in an amber jar. The resulting mixtures were stirred until the cationic monomer (which is typically a solid powder) dissolved. The various DMAEMA-containing monomers are the same as those described for Examples 35-43. Ageflex FA-1Q80MC for Example 52 is N,N-dimethylaminoethyl acrylate methyl chloride, which is commercially available from Ciba Specialty Chemicals (Tarrytown, N.Y.). The cationic monomer MP-8275 for Example 53 is N,N-dimethylaminoethyl acrylate methosulfate (40% in water), which is commercially available from ABCR GmbH and Co. KG (Karlsruhe, Germany). There was no IPA in these samples.

TABLE 5

Cationic monomer solutions in IPA

| Sample ID | Cationic monomer | Cationic monomer (g) | IPA (g) | Water (g) | Irgacure 2959 (g) |
|---|---|---|---|---|---|
| 46 | DMAEMA-$C_4$ | 2.00 | 8.00 | 0 | 0.04 |
| 47 | DMAEMA-$C_8$ | 2.00 | 8.00 | 0 | 0.04 |
| 48 | DMAEMA-$C_{12}$ | 2.00 | 8.00 | 0 | 0.04 |
| 49 | DMAEMA-$C_{16}$ | 2.00 | 8.00 | 0 | 0.04 |
| 50 | DMAEMA-$C_{18}$ | 2.00 | 8.00 | 0 | 0.04 |
| 51 | DMAEMA-$C_{22}$ | 2.00 | 8.00 | 0 | 0.04 |
| 52 | Ageflex FA-1Q80MC | 2.00 | 0 | 1 | 0.04 |
| 53 | MP-8275 | 2.00 | 0 | 1 | 0.04 |

The monomer solutions described in Table 5 (4 grams of each solution) were combined with 2 grams of dried beads each and allowed to contact the beads for 4 hours in a dark drawer to prevent premature curing under visible light. The beads were filtered and rinsed, then weighed to determine the amount of monomer solution absorbed into the beads as shown in Table 6. The beads were placed in a shallow aluminum pan and post-cured using a conveyor belt UV processor at two passes. Total UVA energy was 445 mJ/cm$^2$.

The beads were evaluated for antimicrobial performance using both the Zone of Inhibition test method and the ASTM E2149-01 test method. The results are shown in Table 6 below.

The data in Table 6 show an increase in bead absorption weight over the data in Table 4. This may be due to using IPA instead of propylene glycol as the monomer solvent. In addition, the last two samples in Table 6 show much higher absorption weight. This is due to using water as the solvent. Although the total volume absorbed is not much different, the weight gain is significantly larger with water rather than IPA due to its higher density.

Antimicrobial performance for the medium sized monomers (DMAEMA-$C_{12}$ and DMAEMA-$C_{16}$) is best as seen in the previous example.

TABLE 6

Antimicrobial Performance Results

| | % increase in bead weight | Zone of Inhibition (mm) | | Reduction of % Microorganism Using ASTM E2149-01 | |
|---|---|---|---|---|---|
| Example | | S. aureus | Ps. aeruginosa | S. aureus | Ps. aeruginosa |
| 46 | 52.3 | none | none | 86.6 | 10.7 |
| 47 | 42.7 | 2.5 | none | 94.8 | 99.9 |
| 48 | 37.2 | 8.5 | none | 96.3 | 100 |
| 49 | 38.0 | 2.5 | none | 99.9 | 99.4 |
| 50 | 40.8 | none | none | 100 | 90.8 |
| 51 | 50.1 | none | none | 80.3 | 0 |
| 52 | 114.6 | none | none | 100 | 98 |
| 53 | 124.1 | 11.2 | 7.4 | 100 | 100 |

Example 54-63

Addition of Humectants

Hydrogel beads were made in accordance with Example 1 from homogenous precursor compositions containing the components shown in Table 7. SR415 is (ethoxylated (20) trimethylolpropane triacrylate) with 100 percent solids that is commercially available from Sartomer (Exton, Pa.). The average functionality of the monomer was 2.5. Various humectants were added to the polymeric beads when they were formed.

Examples 54-56 contained various levels of COLAMOIST 200 and Examples 57-59 contained various levels of COLAMOIST 300P. COLAMOIST 200 and COLAMOIST 300P are both commercially available from Colonial Chemical, Inc. (South Pittsburg, Tenn.). COLAMOIST 200 is hydroxypropyl bis-hydroxyethyldiammonium chloride with 73.1 percent solids and COLAMOIST 300P is a polymeric material containing multiple quaternary ammonium ions with 69.4 percent solids. This polymeric material is (poly(hydroxypropyl tetra(2-hydroxypropyl)ethylenediammonium) chlorides). Examples 60-62 contained various levels of sodium lactate. Sodium lactate was obtained from Purac America (Lincolnshire, Ill.). No humectant was added to Example 63, which is the control.

TABLE 7

Precursor Compositions for Examples 56-65

| | 54 | 55 | 56 | 57 | 58 | 59 | 60 | 61 | 62 | 63 |
|---|---|---|---|---|---|---|---|---|---|---|
| Sartomer SR415 (g) | 40 | 40 | 40 | 40 | 40 | 40 | 40 | 40 | 40 | 40 |
| Colamoist 200 (g) | 2.74 | 5.47 | 10.94 | | | | | | | |
| Colamoist 300P (g) | | | | 2.88 | 5.76 | 11.53 | | | | |
| Sodium Lactate (g) | | | | | | | 3.33 | 6.67 | 13.33 | |
| Irgacure 2959 (g) | 1 | 1 | 1 | 1 | 1 | 1 | 1 | 1 | 1 | 1 |
| Water (g) | 57.26 | 53.53 | 48.06 | 56.12 | 53.24 | 47.47 | 55.67 | 52.33 | 45.67 | 59 |

The beads were tested for water activity using an Aqua Lab CX-2 model water activity meter available from Decagon Devices, Inc. (Pullman, Wash.). The instrument was calibrated initially with a saturated NaCl solution, followed by a run using a deionized water sample. Activity of saturated NaCl solution needed to be close to 0.753, while activity of pure DI water should be 0.99-1.00.

Approximately 1.0 gram of beads was weighed directly into disposable, activity, sample cups (approximately 1" diameter circular cup, approximate depth of ¼"). The exact mass was recorded. The sample was immediately loaded into the activity meter and ran until readings stabilized and the machine indicated the end of the run when two measurements of $A_w$ were less than 0.001 apart. Temperature was measured by the activity meter and recorded at the conclusion of the run. The water activity decrease significantly as the level of humectant increased.

TABLE 8

Water Activity of Hydrogel beads with different Humectants

| Example | Weight Percent Humectant | Mass(g) | Temp (C.) | Activity |
|---|---|---|---|---|
| 54 | 2 wt-% Colamoist 200 | 1.01 | 26.0 | 0.990 |
| 55 | 4 wt-% Colamoist 200 | 1.04 | 26.1 | 0.983 |
| 56 | 8 wt-% Colamoist 200 | 1.01 | 26.2 | 0.970 |
| 57 | 2 wt-% Colamoist 300P | 0.91 | 26.3 | 0.993 |
| 658 | 4 wt-% Colamoist 300P | 1.04 | 26.3 | 0.986 |
| 59 | 8 wt-% Colamoist 300P | 1.06 | 26.4 | 0.975 |
| 60 | 2 wt-% Sodium Lactate | 1.04 | 26.4 | 0.980 |
| 61 | 4 wt-% Sodium Lactate | 1.00 | 26.4 | 0.963 |
| 62 | 8 wt-% Sodium Lactate | 0.81 | 26.4 | 0.931 |
| 63 | No humectant | 1.06 | 26.6 | 0.996 |
| | Saturated NaCl | | 25.7 | 0.754 |
| | Water: Prior to Bead Testing | | 25.9 | 0.995 |
| | Water: Following Bead Testing | | 26.5 | 0.994 |

Example 64

Ninhydrin Containing Hydrogel Bead

Dried beads (0.95 grams), prepared as described in Example 19, were contacted with 1 weight percent ninhydrin aqueous solution (3 mL) at room temperature for 24 hours. Ninhydrin is available from Aldrich Chemical Co. (Milwaukee, Wis.). After exposure to the ninhydrin solution, the beads were rinsed with water and ethanol, and then dried in air for 4 hours. The dried ninhydrin-containing beads were kept in closed vials for future use.

A first sample of the ninhydrin-containing beads was contacted with buminate albumin and a second sample of the ninhydrin-containing beads was contacted with a pork juice solution. The buminate albumin (25 weight percent) was obtained from Baxter Healthcare Co. The pork juice solution was prepared by extracting about 16 gram of fresh pork chop meat with 20 mL of water for 16 hours; the resulting mixture was filtered. The total protein in the meat juice was measured according to Pierce assay and ranged from approximately 17 mg/mL to 37 mg/mL.

To expose the ninhydrin-containing beads to these two samples, six ninhydrin-containing beads (about 100 mg) were added to two separate vials (4 mL). Then, 1 mL pork juice was added to the first vial and 1 mL buminate albumin protein aqueous solution (5 weight percent) was added to the second vial. In about 40 minutes, both vials started to turn blue, and eventually turned purple. In the vial with pork juice, the beads turned purple but the pork juice didn't change color. However, in the vial with buminate albumin, the solution turned purple while the beads showed no purple color.

The invention has been described with reference to various embodiments and techniques. However, it will be apparent to one of ordinarily skill in the art that many variations and modifications may be made while remaining within the spirit and scope of the invention.

We claim:

1. A method of making a polymeric bead, the method comprising:
   providing a precursor composition comprising:
   a) greater than 10 weight percent polar solvent based on a total weight of the precursor composition, wherein the polar solvent is not a monomer and wherein the polar solvent is water, a water-miscible organic solvent, or a mixture thereof; and
   b) polymerizable material capable of free-radical polymerization and having an average number of ethylenically unsaturated groups per monomer molecule equal to at least 1.5 based on all of the polymerizable material in the precursor composition, wherein the polymerizable material is miscible with the polar solvent and wherein the polymerizable material comprises a poly(alkylene oxide (meth)acrylate) having at least 2 (meth)acryloyl functionality groups and having at least 10 alkylene oxide units;
   forming a droplet of the precursor composition, wherein the droplet is totally surrounded by a gas phase; and
   exposing the droplet to radiation for a time sufficient to at least partially polymerize the polymerizable material and to form a first swollen polymeric bead.

2. The method of claim 1, wherein the polymerizable material comprises a poly(alkylene oxide) (meth)acrylate) having at least 20 alkylene oxide units.

3. The method of claim 1, wherein the poly(alkylene oxide (meth)acrylate) has a weight average molecular weight no greater than 2000 g/mole.

4. The method of claim 1, wherein the method further comprises
   removing at least a portion of the polar solvent from the first swollen bead to form a dried bead.

5. The method of claim 1, wherein the precursor composition further comprises an active agent.

6. The method of claim 5, wherein the active agent comprises a bioactive agent.

7. The method of claim 1, wherein the precursor composition further comprises a photoinitiator and the radiation comprises actinic radiation.

8. The method of claim 1, wherein the method further comprises
   removing at least a portion of the polar solvent from the first swollen bead to form a dried bead; and
   contacting the dried bead with a sorbate for a time sufficient for the dried bead to sorb at least a portion of the sorbate to form a second swollen polymeric bead, wherein the sorbate comprises at least one active agent.

9. The method of claim 8, wherein the method further comprises drying the second swollen polymeric bead.

10. A method of preparing an article comprising a polymeric bead, the method comprising:
    providing a precursor composition comprising
    a) greater than 10 weight percent to 85 weight percent polar solvent based on a total weight of the precursor composition, wherein the polar solvent is not a monomer and wherein the polar solvent is water, a water-miscible organic solvent, or a mixture thereof; and
    b) 15 weight percent to less than 90 weight percent polymerizable material based on the total weight of the precursor composition, the polymerizable material being capable of free-radical polymerization and having an average number of ethylenically unsaturated groups per monomer molecule equal to at least 1.5 based on all of the polymerizable material in the precursor composition, the polymerizable material being miscible in the polar solvent and comprising
       i) a poly(alkylene oxide (meth)acrylate) having at least 2 (meth)acryloyl functionality groups and having at least 10 alkylene oxide units; and
       ii) 0 to less than 20 weight percent anionic monomer based on a total weight of polymerizable material in the precursor composition, wherein the anionic monomer comprises an ethylenically unsaturated group in addition to an acidic group, a salt of the acidic group, or a mixture thereof;
    forming a droplet of the precursor composition, wherein the droplet is totally surrounded by a gas phase; and
    exposing the droplet to radiation for a time sufficient to at least partially polymerize the polymerizable material and to form a first swollen bead.

11. The method of claim 10, wherein the method further comprises
    removing at least a portion of the polar solvent from the first swollen bead to form a dried bead.

12. The method of claim 10, wherein the precursor composition comprises less than 1 weight percent anionic monomer based on the weight of the polymerizable material.

13. The method of claim 10, wherein the poly(alkylene oxide (meth)acrylate) has a weight average molecular weight less than 2000 g/mole.

14. The method of claim 10, wherein the precursor composition further comprises an active agent.

15. The method of claim 14, wherein the active agent comprises a bioactive agent.

16. The method of claim 10, wherein the precursor composition further comprises a photoinitiator and the radiation comprises actinic radiation.

17. The method of claim 10, wherein the method further comprises
    removing at least a portion of the polar solvent from the first swollen bead to form a dried bead; and
    contacting the dried bead with a sorbate for a time sufficient for the dried bead to sorb at least a portion of the sorbate to form a second swollen polymeric bead, wherein the sorbate comprises an active agent.

18. The method of claim 17, wherein the active agent comprises an ethylenically unsaturated group and a photoinitiator, the method further comprises exposing the second swollen polymeric bead to actinic radiation.

19. The method of claim 17, wherein the method further comprises drying the second swollen polymeric bead.

20. An article comprising a polymeric bead having no discernible pores or voids when viewed with a scanning electron microscope with a magnification up to 50 times, wherein the polymeric bead comprises a free-radical polymerization reaction product of a precursor composition comprising
    a) greater than 10 weight percent to no greater than 85 weight percent polar solvent based on a total weight of the precursor composition, wherein the polar solvent is not a monomer and wherein the polar solvent is water, a water-miscible organic solvent, or a mixture thereof; and
    b) 15 weight percent to less than 90 weight percent polymerizable material based on the total weight of the precursor composition, the polymerizable material being capable of free-radical polymerization and having an average number of ethylenically unsaturated groups per monomer molecule equal to at least 1.5 based on all of the polymerizable material in the precursor composition, the polymerizable material being miscible in the polar solvent and comprising i) a poly(alkylene oxide (meth)acrylate) having at least 2 (meth)acryloyl groups and having at least 510 alkylene oxide units; and ii) 0 to less than 20 weight percent anionic monomer based on a total weight of polymerizable material in the precursor composition, wherein the anionic monomer comprises an ethylenically unsaturated group in addition to an acidic group, a salt of the acidic group, or a mixture thereof.

21. The article of claim 20, wherein the polymeric bead further comprises an active agent.

22. The method of claim 1, wherein the precursor composition comprises 40 to 80 weight percent polar solvent.

23. The method of claim 10, wherein the precursor composition comprises 40 to 80 weight percent polar solvent.

24. The article of claim 20, wherein the precursor composition comprises 40 to 80 weight percent polar solvent.

* * * * *

UNITED STATES PATENT AND TRADEMARK OFFICE
CERTIFICATE OF CORRECTION

PATENT NO.       : 8,513,322 B2
APPLICATION NO.  : 11/759283
DATED            : August 20, 2013
INVENTOR(S)      : Robin E. Wright et al.

It is certified that error appears in the above-identified patent and that said Letters Patent is hereby corrected as shown below:

Title Page 3, Column 2 (Other Publications)
Line 21, delete "Tuncel, A., Applied et al.," and insert -- Tuncel, A., et al., --, therefor.

In the Specifications

Column 14
Line 23, delete "that that" and insert -- that --, therefor.

Column 24
Lines 33-34, delete "biguamide" and insert -- biguanide --, therefor.

Line 37, delete "octenidene" and insert -- octenidine --, therefor.

Column 26
Line 2, delete "phenothalein" and insert -- phenolphthalein --, therefor.

Column 30
Line 15, delete "Prudue" and insert -- Purdue --, therefor.

Column 32
Line 22, delete "Ticlosan" and insert -- Triclosan --, therefor.

Column 35
Line 4, delete "biguamide" and insert -- biguanide --, therefor.

Column 36
Line 3, delete "Bromopol" and insert -- Bronopol --, therefor.

Line 17, delete "Bromopol" and insert -- Bronopol --, therefor.

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,513,322 B2

Line 20, delete "Barbac" and insert -- Bardac --, therefor.

Column 37
Line 30, "acryloamidopropyl" and insert -- acrylamidopropyl --, therefor.

In the Claims

Column 45
Line 2, in Claim 20, delete "510" and insert -- 10 --, therefor.